United States Patent
Bivolarsky et al.

(10) Patent No.: US 11,788,904 B2
(45) Date of Patent: Oct. 17, 2023

(54) ACOUSTIC TEMPERATURE MEASUREMENT IN LAYERED ENVIRONMENTS

(71) Applicant: PERCEPTIVE SENSOR TECHNOLOGIES, INC., Tucson, AZ (US)

(72) Inventors: Lazar Bivolarsky, Cupertino, CA (US); Joel D. Burcham, Huntsville, AL (US); William Coleman, Tucson, AZ (US); James M. Heim, Tucson, AZ (US)

(73) Assignee: PERCEPTIVE SENSOR TECHNOLOGIES, INC., Tucson, AZ (US)

( * ) Notice: Subject to any disclaimer, the term of this patent is extended or adjusted under 35 U.S.C. 154(b) by 0 days.

(21) Appl. No.: 17/746,640

(22) Filed: May 17, 2022

(65) Prior Publication Data

US 2022/0276102 A1 Sep. 1, 2022

Related U.S. Application Data

(63) Continuation-in-part of application No. 17/543,152, filed on Dec. 6, 2021, now Pat. No. 11,525,743.
(Continued)

(51) Int. Cl.
*G01K 13/12* (2006.01)
*G01K 11/24* (2006.01)

(52) U.S. Cl.
CPC .................. *G01K 11/24* (2013.01)

(58) Field of Classification Search
CPC ........ G01V 1/001; G01B 17/02; G01K 11/24; G01K 13/10
See application file for complete search history.

(56) References Cited

U.S. PATENT DOCUMENTS

| | | | |
|---|---|---|---|
| 2,449,054 A | 9/1948 | Chantlin | 177/311 |
| 3,019,650 A | 2/1962 | Worswick | 73/290 |

(Continued)

FOREIGN PATENT DOCUMENTS

| | | | |
|---|---|---|---|
| CN | 204944617 | 1/2016 | G01F 23/296 |
| CN | 105333925 | 2/2016 | G01F 23/296 |

(Continued)

OTHER PUBLICATIONS

Altpeter et a. Translation of EP2962096 (Year: 2019).*
(Continued)

*Primary Examiner* — Lisa M Caputo
*Assistant Examiner* — Nasir U. Ahmed
(74) *Attorney, Agent, or Firm* — HAYES SOLOWAY P.C.

(57) ABSTRACT

An apparatus, system, and method for measuring a temperature gradient in a layered environment includes a container having a sidewall. An acoustic transducer is positioned on or proximate to an exterior surface of the sidewall of the container. A signal is transmitted from the acoustic transducer into the sidewall of the container. A reflected signal is received by the acoustic transducer, or another acoustic transducer positioned on or proximate to the exterior surface of the sidewall. A computerized device has a processor and a computer-readable memory. The processor is configured to measure a temperature gradient of the reflected signal using an angle of incidence and refraction of the reflected signal. The temperature gradient indicates a temperature of a material within the container.

17 Claims, 12 Drawing Sheets

Related U.S. Application Data

(60) Provisional application No. 63/121,755, filed on Dec. 4, 2020.

(56) References Cited

U.S. PATENT DOCUMENTS

| | | | |
|---|---|---|---|
| 3,703,829 A | 11/1972 | Dougherty | 73/290 |
| 3,837,218 A | 9/1974 | Flambard et al. | G01N 29/00 |
| 3,971,962 A | 7/1976 | Green | H01L 41/08 |
| 4,065,958 A | 1/1978 | Krylova et al. | G01N 29/02 |
| 4,118,983 A | 10/1978 | Braznikov | G01F 23/28 |
| 4,121,468 A | 10/1978 | Glover et al. | G01N 29/04 |
| 4,182,177 A | 1/1980 | Prough | 73/290 |
| 4,208,908 A | 6/1980 | Hickox | G01F 1/66 |
| 4,280,126 A | 7/1981 | White | 340/621 |
| 4,320,659 A | 3/1982 | Lynnworth et al. | G01N 29/02 |
| 4,326,173 A | 4/1982 | Newman | H03L 7/08 |
| 4,501,146 A | 2/1985 | Greenhalgh | G01F 23/28 |
| 4,580,448 A | 4/1986 | Skrgatic | G01F 23/28 |
| 4,596,266 A | 6/1986 | Kinghorn et al. | B65D 88/38 |
| 4,599,892 A | 7/1986 | Doshi | G01F 17/00 |
| 4,676,098 A | 6/1987 | Erlenkämper et al. | 73/290 |
| 4,852,416 A | 8/1989 | Boone et al. | H04R 1/02 |
| 4,934,191 A | 6/1990 | Kroening et al. | 73/592 |
| 4,954,997 A | 9/1990 | Dieulesaint et al. | G08B 21/00 |
| 4,977,780 A | 12/1990 | Machida et al. | G01N 29/04 |
| 5,015,995 A | 5/1991 | Holroyd | 340/621 |
| 5,038,611 A | 8/1991 | Weldon et al. | 73/290 |
| 5,040,415 A | 8/1991 | Barkhoudarian | G01F 1/66 |
| 5,148,700 A | 9/1992 | King | G01N 15/00 |
| 5,195,058 A | 3/1993 | Simon | G01S 15/02 |
| 5,295,120 A | 3/1994 | McShane | 367/188 |
| 5,325,727 A | 7/1994 | Miller et al. | G01F 1/34 |
| 5,415,033 A | 5/1995 | Maresca, Jr. et al. | 73/40.5 |
| 5,438,868 A | 8/1995 | Holden et al. | 73/290 |
| 5,453,944 A | 9/1995 | Baumoel | G06F 17/00 |
| 5,460,046 A | 10/1995 | Maltby et al. | G01N 29/24 |
| 5,469,749 A | 11/1995 | Shimada et al. | G01F 1/38 |
| 5,604,314 A | 2/1997 | Grahn | G01L 5/16 |
| 5,770,806 A | 6/1998 | Hiismaki | G01F 1/662 |
| 5,821,427 A | 10/1998 | Byrd | G01F 1/66 |
| 5,836,192 A | 11/1998 | Getman et al. | G01F 23/28 |
| 6,035,903 A | 3/2000 | Few et al. | B65B 1/04 |
| 6,151,956 A | 11/2000 | Takahashi et al. | G01N 3/56 |
| 6,157,894 A | 12/2000 | Hess et al. | 702/54 |
| 6,192,751 B1 | 2/2001 | Stein et al. | G08B 21/00 |
| 6,330,831 B1 | 12/2001 | Lynnworth et al. | 73/861.28 |
| 6,354,147 B1 | 3/2002 | Gysling et al. | G01N 29/00 |
| 6,368,281 B1 | 4/2002 | Solomon et al. | A61B 8/14 |
| 6,443,006 B1 | 9/2002 | Degrave | G02F 23/00 |
| 6,470,744 B1 | 10/2002 | Usui et al. | 73/290 |
| 6,481,287 B1* | 11/2002 | Ashworth | G01K 11/24 |
| | | | 374/119 |
| 6,513,385 B1 | 2/2003 | Han | G01N 29/00 |
| 6,575,043 B1 | 6/2003 | Huang et al. | G01F 1/66 |
| 6,578,424 B1 | 6/2003 | Ziola et al. | G01N 29/00 |
| 6,631,639 B1 | 10/2003 | Dam et al. | 73/290 |
| 6,672,163 B2 | 1/2004 | Han et al. | G01V 1/28 |
| 6,691,582 B1 | 2/2004 | Nawa et al. | G01F 1/66 |
| 6,836,734 B2 | 12/2004 | Rojas et al. | G06F 19/00 |
| 6,925,868 B2 | 8/2005 | Young et al. | 73/290 |
| 6,938,488 B2 | 9/2005 | Diaz et al. | 73/597 |
| 7,085,391 B1 | 8/2006 | Yamaya | G10H 1/00 |
| 7,114,375 B2 | 10/2006 | Panetta et al. | 73/61.75 |
| 7,246,522 B1 | 7/2007 | Diaz et al. | 73/597 |
| 7,299,136 B2 | 11/2007 | DiFoggio et al. | 702/22 |
| 7,330,797 B2 | 2/2008 | Bailey et al. | G01F 23/00 |
| 7,359,803 B2 | 4/2008 | Gysling et al. | G01N 31/00 |
| 7,363,174 B2* | 4/2008 | Kishiro | G01F 25/10 |
| | | | 73/861.26 |
| 7,430,924 B2 | 10/2008 | Gysling et al. | G01F 1/00 |
| 7,437,946 B2 | 10/2008 | Gysling | G01F 1/22 |
| 7,624,650 B2 | 12/2009 | Gysling et al. | G01F 1/66 |
| 7,624,651 B2 | 12/2009 | Fernald et al. | G01F 1/66 |
| 7,656,747 B2 | 2/2010 | Mandal et al. | G01V 1/44 |
| 7,694,570 B1 | 4/2010 | Dam et al. | 73/644 |
| 7,757,560 B2 | 7/2010 | Hofmann | G01R 33/20 |
| 7,962,293 B2 | 6/2011 | Gysling | G01F 1/76 |
| 7,966,882 B2 | 6/2011 | Greenwood | 73/597 |
| 8,249,829 B2 | 8/2012 | Vass et al. | G06F 19/00 |
| 8,346,491 B2 | 1/2013 | Loose et al. | G01F 1/00 |
| 8,482,295 B2 | 7/2013 | Sadri et al. | G01R 27/04 |
| 8,683,882 B2 | 4/2014 | Jackson | G01N 9/24 |
| 8,820,182 B2 | 9/2014 | Nikolay Nikolov et al. | H04Q 9/00 |
| 8,850,882 B2 | 10/2014 | Qu et al. | G01F 23/296 |
| 8,915,145 B1 | 12/2014 | Van Orsdol | G01F 1/74 |
| 9,057,677 B2 | 6/2015 | Field | G01N 29/032 |
| 9,383,476 B2 | 7/2016 | Trehan et al. | G01V 11/00 |
| 9,557,208 B2 | 1/2017 | Kuroda et al. | G01F 23/28 |
| 9,772,311 B2 | 9/2017 | Liljenberg et al. | G01N 29/032 |
| 9,816,848 B2 | 11/2017 | Raykhman et al. | G01F 1/86 |
| 9,891,085 B2 | 2/2018 | Muhammad et al. | G01F 1/88 |
| 10,122,051 B2 | 11/2018 | Kuhne et al. | H01M 10/484 |
| 10,215,613 B2 | 2/2019 | Kassubek et al. | G01F 23/296 |
| 10,458,871 B2 | 10/2019 | Norli | G01L 11/04 |
| 10,794,871 B1 | 10/2020 | Blackshire et al. | G01N 29/265 |
| 11,020,793 B2 | 6/2021 | De Monte et al. | B22D 2/006 |
| 11,047,721 B2 | 6/2021 | Schöb et al. | G01F 1/66 |
| 11,274,952 B2 | 3/2022 | Bober et al. | G01F 1/66 |
| 11,293,791 B2 | 4/2022 | Firouzi et al. | G01F 1/66 |
| 11,536,696 B2 | 12/2022 | Bivolarsky et al. | G01N 29/44 |
| 2002/0170753 A1 | 11/2002 | Clare | G01G 19/22 |
| 2002/0173230 A1 | 11/2002 | Mayes | B24B 49/00 |
| 2004/0035208 A1 | 2/2004 | Diaz et al. | G01N 29/18 |
| 2004/0079150 A1 | 4/2004 | Breed et al. | 73/291 |
| 2004/0173021 A1 | 9/2004 | Lizon et al. | 73/290 |
| 2004/0226615 A1 | 11/2004 | Morikawa et al. | G05D 7/06 |
| 2005/0055136 A1 | 3/2005 | Hofmann et al. | 700/273 |
| 2005/0102109 A1 | 5/2005 | Dubois et al. | G01B 5/28 |
| 2005/0128873 A1 | 6/2005 | LaBry | G01V 1/40 |
| 2005/0178198 A1 | 8/2005 | Freger et al. | 73/290 |
| 2005/0247070 A1 | 11/2005 | Arshansky et al. | 62/77 |
| 2006/0196224 A1 | 9/2006 | Esslinger | 62/509 |
| 2007/0001028 A1 | 1/2007 | Gysling | B05B 7/30 |
| 2007/0068248 A1 | 3/2007 | Freger et al. | G01F 23/28 |
| 2007/0068253 A1 | 3/2007 | Carodiskey | A61B 6/00 |
| 2007/0157737 A1 | 7/2007 | Gysling et al. | G01F 1/667 |
| 2007/0205907 A1 | 9/2007 | Schenk, Jr. | G08B 21/00 |
| 2008/0092623 A1 | 4/2008 | Lynch et al. | G01N 29/02 |
| 2008/0101158 A1 | 5/2008 | Hosseini et al. | G01S 15/00 |
| 2009/0143681 A1 | 6/2009 | Jurvelin et al. | A61B 8/00 |
| 2010/0046576 A1 | 2/2010 | Desai | G01K 11/22 |
| 2010/0111133 A1* | 5/2010 | Yuhas | G01K 17/00 |
| | | | 374/30 |
| 2010/0199779 A1 | 8/2010 | Liu et al. | G01F 1/663 |
| 2010/0218599 A1 | 9/2010 | Young et al. | G01F 23/296 |
| 2010/0242593 A1 | 9/2010 | Lagergren et al. | G01F 23/296 |
| 2010/0307249 A1 | 12/2010 | Lesage et al. | G01N 29/04 |
| 2011/0029262 A1 | 2/2011 | Barkhouse | 702/55 |
| 2011/0072904 A1 | 3/2011 | Lam et al. | G01N 29/04 |
| 2011/0120218 A1 | 5/2011 | Aldridge | 73/290 |
| 2011/0239769 A1 | 10/2011 | Schmitt et al. | G01N 29/02 |
| 2011/0271769 A1 | 11/2011 | Kippersund et al. | G01F 1/66 |
| 2011/0284288 A1 | 11/2011 | Sawyer et al. | E21B 49/005 |
| 2012/0024067 A1 | 2/2012 | Oberdoerfer et al. | G01N 29/00 |
| 2012/0055239 A1 | 3/2012 | Sinha | G01N 29/02 |
| 2012/0173169 A1 | 7/2012 | Skelding | G06F 19/00 |
| 2012/0222471 A1 | 9/2012 | Raykhman et al. | G01N 29/02 |
| 2012/0259560 A1 | 10/2012 | Woltring et al. | 702/55 |
| 2012/0262472 A1 | 10/2012 | Garr et al. | G06T 11/206 |
| 2012/0265454 A1 | 10/2012 | Rudd et al. | G01F 1/66 |
| 2012/0281096 A1 | 11/2012 | Gellaboina et al. | G01S 15/89 |
| 2013/0002443 A1 | 1/2013 | Breed et al. | G08B 21/00 |
| 2013/0068027 A1 | 3/2013 | Sullivan et al. | G01N 29/04 |
| 2013/0080081 A1 | 3/2013 | Dugger et al. | G01F 1/663 |
| 2013/0090575 A1 | 4/2013 | Rupp et al. | A61N 7/00 |
| 2013/0120155 A1 | 5/2013 | Hagg | G08C 19/16 |
| 2013/0128035 A1 | 5/2013 | Johns et al. | 348/135 |
| 2013/0213714 A1 | 8/2013 | Fuida | E21B 49/00 |
| 2014/0020478 A1 | 1/2014 | Ao et al. | G01F 1/66 |
| 2014/0027455 A1 | 1/2014 | Castellano et al. | B65D 88/34 |
| 2014/0076415 A1 | 3/2014 | Dunki-Jacobs et al. | E03C 1/02 |
| 2014/0107435 A1 | 4/2014 | Sharf et al. | A61B 8/00 |

(56) References Cited

U.S. PATENT DOCUMENTS

| | | | |
|---|---|---|---|
| 2014/0223992 A1 | 8/2014 | Harper et al. | G01F 25/0084 |
| 2014/0301902 A1 | 10/2014 | Fernald et al. | B01J 19/10 |
| 2014/0375169 A1 | 12/2014 | Na et al. | H01L 41/08 |
| 2015/0075278 A1 | 3/2015 | Dockendorff et al. | G01F 23/296 |
| 2015/0198471 A1 | 7/2015 | Furlong et al. | G01F 1/66 |
| 2015/0212045 A1 | 7/2015 | Raykhman et al. | G01F 1/74 |
| 2015/0247751 A1 | 9/2015 | Kutlik et al. | G01F 23/2962 |
| 2015/0260003 A1 | 9/2015 | McHugh et al. | E21B 33/076 |
| 2015/0276463 A1 | 10/2015 | Milne et al. | G01F 23/296 |
| 2015/0369647 A1 | 12/2015 | Kumar et al. | G01F 23/284 |
| 2016/0025545 A1 | 1/2016 | Saltzgiver et al. | G01F 23/263 |
| 2016/0041024 A1 | 2/2016 | Reimer et al. | G01F 23/296 |
| 2016/0108730 A1 | 4/2016 | Fanini et al. | E21B 49/08 |
| 2016/0109304 A1* | 4/2016 | Yan | G01K 11/24 374/1 |
| 2016/0146653 A1 | 5/2016 | Skelding | E21B 21/01 |
| 2016/0169839 A1 | 6/2016 | Gottlieb et al. | G01N 29/02 |
| 2016/0216141 A1 | 7/2016 | Leaders et al. | G01F 1/66 |
| 2016/0265954 A1 | 9/2016 | Bachmann et al. | G01F 1/667 |
| 2016/0320226 A1 | 11/2016 | Schaefer et al. | G01F 23/296 |
| 2017/0002954 A1 | 1/2017 | Brown et al. | F16K 37/0058 |
| 2017/0010144 A1 | 1/2017 | Lenner et al. | G01F 23/296 |
| 2017/0010145 A1 | 1/2017 | Lenner et al. | G01F 23/2962 |
| 2017/0010146 A1 | 1/2017 | Kassubek et al. | G01F 23/2962 |
| 2017/0059389 A1 | 3/2017 | Moore et al. | G01F 23/2968 |
| 2017/0082650 A1 | 3/2017 | Hies et al. | G01F 25/0007 |
| 2017/0087526 A1 | 3/2017 | Luharuka | B01F 15/00 |
| 2017/0102095 A1 | 4/2017 | Kunita et al. | F16K 37/0091 |
| 2017/0097322 A1 | 6/2017 | Giese et al. | G01N 29/07 |
| 2017/0199295 A1 | 7/2017 | Mandal | G01V 1/50 |
| 2017/0202595 A1 | 7/2017 | Shelton, IV | A61B 18/00 |
| 2017/0239741 A1 | 8/2017 | Furuta | B23H 1/10 |
| 2017/0268915 A1 | 9/2017 | Gestner et al. | G01F 1/66 |
| 2017/0309989 A1 | 10/2017 | Waelde et al. | H01Q 1/225 |
| 2018/0035603 A1 | 2/2018 | Kremmer et al. | A01C 7/20 |
| 2018/0044159 A1 | 2/2018 | Crouse et al. | B67D 1/0406 |
| 2018/0080809 A1 | 3/2018 | Tokarev et al. | G01F 23/2965 |
| 2018/0113663 A1 | 4/2018 | Jain | G06F 3/14 |
| 2018/0149505 A1* | 5/2018 | Ploss | G01F 1/667 |
| 2018/0266874 A1 | 9/2018 | Montoya et al. | G01F 23/68 |
| 2018/0299317 A1 | 10/2018 | Truong et al. | G01F 23/2925 |
| 2018/0306628 A1 | 10/2018 | Parrott et al. | G01F 17/00 |
| 2018/0348169 A1 | 12/2018 | Lee et al. | G01N 29/11 |
| 2019/0011304 A1 | 1/2019 | Cunningham et al. | G01F 17/00 |
| 2019/0063984 A1 | 2/2019 | Bowley | G01F 23/2962 |
| 2019/0078927 A1 | 3/2019 | Takayama et al. | G01F 23/2965 |
| 2019/0137310 A1 | 5/2019 | Xiao et al. | G01F 1/06 |
| 2019/0154480 A1 | 5/2019 | Schöb et al. | G01F 1/662 |
| 2019/0195629 A1 | 6/2019 | Vaissiere | G01C 9/00 |
| 2019/0195830 A1* | 6/2019 | Tamura | G01N 29/2437 |
| 2019/0272496 A1 | 9/2019 | Moeller | G06Q 10/087 |
| 2019/0368908 A1 | 12/2019 | Aughton et al. | G01F 1/66 |
| 2020/0018628 A1 | 1/2020 | Head et al. | G21C 17/022 |
| 2020/0182736 A1 | 6/2020 | Kim et al. | G01M 3/2807 |
| 2020/0195449 A1 | 6/2020 | Obaidi | H04L 9/38 |
| 2020/0378283 A1 | 12/2020 | Zhang et al. | F01M 11/10 |
| 2020/0378812 A1 | 12/2020 | Heim | G01F 1/667 |
| 2020/0378818 A1 | 12/2020 | Heim et al. | G01F 23/296 |
| 2021/0382014 A1 | 12/2021 | Xu et al. | G01N 29/24 |
| 2022/0034850 A1 | 2/2022 | Zhang et al. | G01N 29/22 |
| 2022/0178879 A1 | 6/2022 | Bivolarsky et al. | G02N 29/028 |
| 2022/0178881 A1 | 6/2022 | Bivolarsky et al. | G01N 29/04 |

FOREIGN PATENT DOCUMENTS

| | | | |
|---|---|---|---|
| CN | 105548370 | 5/2016 | G01N 29/24 |
| DE | 10 2010 029 254 | 12/2011 | F01N 3/10 |
| EP | 0372700 | 6/1990 | G01F 23/28 |
| EP | 2450701 | 5/2012 | G01N 29/22 |
| EP | 2962096 | 8/2019 | G01L 1/255 |
| GB | 2192717 | 1/1990 | G01N 29/00 |
| JP | H1073385 | 3/1998 | F28D 15/02 |
| JP | 2000314651 | 11/2000 | G01F 23/28 |
| JP | 2002340654 | 11/2002 | G01F 23/28 |
| JP | 2013140029 | 7/2013 | F01K 5/02 |
| KR | 200174618 | 3/2000 | G01N 29/24 |
| WO | WO 87/04793 | 8/1987 | G01N 29/00 |
| WO | WO 8809895 | 12/1988 | F16K 37/00 |
| WO | WO9010849 | 9/1990 | G01F 23/28 |
| WO | WO 2007/149605 | 12/2007 | |
| WO | WO2008079202 | 7/2008 | G01F 3/36 |
| WO | WO 2009/154719 | 12/2009 | G01F 17/00 |
| WO | WO 2014/021846 | 2/2014 | G01F 1/66 |
| WO | WO 2014/167471 | 10/2014 | G01F 23/30 |
| WO | WO 2020/136945 | 7/2020 | G01F 23/296 |

OTHER PUBLICATIONS

Amjad, Umar et al, "Advanced signal processing technique for damage detection in steel tubes" Proceedings of SPIE, Health Monitoring of Structural and Biological Systems 2016, 980511 (Apr. 1, 2016);14 pgs.

Amjad, Umar et al. "Change in time-to-flight of longitudinal (axisymmetric) wave modes due to lamination in steel pipes" Proceedings of SPIE vol. 8695, Health Monitoring of Structural and Biological Systems 2013, 869515 (Apr. 17, 2013); 10 pgs.

Amjad, Umar et al., "Effects of transducers on guided wave based structural health monitoring" Proceedings of SPIE, vol. 10600, Health Monitoring of Structural and Biological Systems XII, 106000F (Apr. 23, 2018),10 pgs.

Amjad, U. et al., "Generalized representations and universal aspects of Lamb wave dispersion relations" Proceedings of SPIE, vol. 7650, Health Monitoring of Structural and Biological Systems 2010, 76502F (Apr. 8, 2010), 9 pgs.

Amjad, Umar et al., "Detection and quantification of pipe damage from change in time of flight and phase" *Ultrasonics* vol. 62 (2015) pp. 223-236, Jun. 11, 2015, 14 pgs.

Amjad, Umar et al., "Detection and quantification of diameter reduction due to corrosion in reinforcing steel bars" *Structural Health Monitoring* 2015, vol. 14(5) 532-543, 12 pgs.

Amjad, Umar et al., "Detection and quantification of delamination in laminated plates from the phase of appropriate guided wave modes" *Optical Engineering* 55(1), Jan. 2016, 11 pgs.

API: American Petroleum Institute Preliminary Program, Oct. 16-17, 2019, 5 pages.

Gurkov, Andrey "Gigantic Druzhba oil pipeline paralyzed for weeks" May 7, 2019, 3 pages, https://www.dw.com/en/gigantic-druzhba-oil-pipeline-paralyzed-for-weeks/a-48638989.

Hassanzadeh et al., "Investigation of factors affecting on viscosity reduction of sludge from Iranian crude oil storage tanks", Petroleum Science, vol. 15, Jul. 2018, pp. 634-643.

Kak et al., "Principles of Computerized Tomographic Imaging", IEEE, 1988, Chapter 2, 48 pgs.

Luck, Marissa "Deer Park fire a 'blemish' for the petrochemical industry's image" *Houston Chronicle*, Mar. 26, 2019, 3 pages https://www.houstonchronicle.com/business/energy/article/Deer-Park-fire-a-blemish-for-the-image-of-13717661.php.

Pandey, "Ultrasonic attenuation in condensed matter", Dissertation for V.B.S. Purvanchal University, 2009, Chapter 1, 36 pgs.

Pluta et al., "Stress Dependent Dispersion Relations of Acoustic Waves Travelling on a Chain of Point Masses Connected by Anharmonic Linear and Torsional Springs" *International Congress on Ultrasonics* AIP Conf. Proc. 1433, 471-474 (2012); 5 pgs.

Shelke, et al., "Mode-Selective Excitation and Detection of Ultrasonic Guided Waves for Delamination Detection in Laminated Aluminum Plates" IEEE Transactions on Ultrasonics, Ferroelectrics, and Frequency Control, vol. 58, No. 3, Mar. 2011, 11 pgs.

"TOPS Terminal Operating Practices Symposium" Program Agenda, Apr. 11, 2018, 1 page.

Zadler, et al., "Resonant Ultrasound Spectroscopy: theory and application", Geophysical Journal International, vol. 156, Issue 1, Jan. 2004, pp. 154-169.

(56) References Cited

OTHER PUBLICATIONS

Vermeersch, "Influence of substrate thickness on thermal impedance of microelectronic structures", Microelectronics Reliability, 47, 2007, pp. 437-443.
Examination Report No. 1 issued in Australian Application No. 2020283140 dated Jan. 4, 2022, 6 pgs.
Examination Report No. 1 issued in Australian Patent Application No. 2020302919, dated Feb. 15, 2022, 4 pgs.
International Search Report and Written Opinion issued in PCT/US20/35404, dated Aug. 24, 2020, 11 pages.
International Preliminary Report on Patentability issued in PCT/US20/35404 dated Nov. 16, 2021, 8 pgs.
International Search Report and Written Opinion issued in PCT/US20/39966, dated Sep. 18, 2020, 13 pages.
International Preliminary Report on Patentability issued in PCT/US20/39966 dated Dec. 28, 2021, 10 pgs.
International Search Report and Written Opinion issued in PCT/US21/61962 dated Feb. 16, 2022, 9 pgs.
International Search Report and Written Opinion issued in PCT/US21/61924 dated Feb. 16, 2022, 9 pgs.
International Search Report and Written Opinion issued in PCT/US21/62010 dated Feb. 16, 2022, 9 pgs.
International Search Report and Written Opinion issued in PCT/US21/61970 dated Feb. 18, 2022, 17 pgs.
International Search Report and Written Opinion issued in PCT/US21/61925 dated Feb. 18, 2022, 9 pgs.
International Search Report and Written Opinion issued in PCT/US21/61646 dated Feb. 25, 2022, 9 pgs.
International Search Report and Written Opinion issued in PCT/US21/65664 dated Mar. 11, 2022, 9 pgs.
International Search Report and Written Opinion issued in PCT/US21/62001 dated Mar. 9, 2022, 9 pgs.
International Search Report and Written Opinion issued in PCT/US21/61926 dated Mar. 8, 2022, 9 pgs.
Notice of Allowance issued in U.S. Appl. No. 16/888,469, dated Dec. 23, 2020, 16 pgs.
Notice of Allowance issued in U.S. Appl. No. 17/148,122 dated Jun. 16, 2021, 8 pgs.
Notice of Allowance issued in U.S. Appl. No. 16/914,092 dated Oct. 28, 2021, 14 pgs.
Notice of Acceptance issued in Australian Application No. 2020302919 dated Mar. 2, 2022, 4 pgs.
Notice of Acceptance issued in Australian Application No. 2020283140 dated Mar. 30, 2022, 4 pgs.
Notice of Allowance issued in Canadian Application No. 3,140,008 dated May 5, 2022, 1 pg.
Office Action issued in Australian Patent Application No. 2020283140, dated Mar. 18, 2022, 5 pgs.
Office Action issued in Canadian Patent Application No. 3,140,008, dated Feb. 14, 2022, 4 pgs.
Office Action issued in U.S. Appl. No. 16/888,469, dated Aug. 5, 2020, 8 pages.
Office Action issued in U.S. Appl. No. 16/888,469, dated Sep. 8, 2020, 20 pages.
Office Action issued in U.S. Appl. No. 16/914,092, dated Nov. 10, 2020, 22 pgs.
Office Action issued in U.S. Appl. No. 16/914,092, dated Mar. 1, 2021, 25 pgs.
Office Action issued in U.S. Appl. No. 16/914,092, dated Jun. 24, 2021, 24 pgs.
Office Action issued in U.S. Appl. No. 17/148,122, dated Mar. 2, 2021, 26 pgs.
Office Action issued in U.S. Appl. No. 17/543,200, dated Mar. 9, 2022, 8 pages.
Office Action issued in U.S. Appl. No. 17/542,465, dated Mar. 11, 2022, 22 pages.
Office Action issued in U.S. Appl. No. 17/542,461, dated Mar. 10, 2022, 18 pages.
Office Action issued in U.S. Appl. No. 17/542,872, dated Mar. 17, 2022, 22 pages.
Office Action issued in U.S. Appl. No. 17/566,020, dated Mar. 18, 2022, 20 pages.
Office Action issued in U.S. Appl. No. 17/541,036, dated Mar. 31, 2022, 22 pages.
Office Action issued in U.S. Appl. No. 17/543,152, dated Apr. 19, 2022, 17 pages.
Office Action issued in U.S. Appl. No. 17/542,814, dated Apr. 25, 2022, 21 pages.
Office Action issued in U.S. Appl. No. 17/542,462, dated May 27, 2022, 28 pages.
Office Action issued in U.S. Appl. No. 17/542,461, dated Jun. 27, 2022, 13 pages.
Office Action issued in U.S. Appl. No. 17/566,020, dated Jul. 12, 2022, 20 pages.
Office Action issued in U.S. Appl. No. 17/543,200, dated Jul. 20, 2022, 25 pages.
Office Action issued in U.S. Appl. No. 17/746,622, dated Jul. 22, 2022, 19 pages.
Office Action issued in U.S. Appl. No. 17/541,036, dated Aug. 9, 2022, 22 pages.
Notice of Allowance issued in U.S. Appl. No. 17/542,465, dated Jul. 11, 2022, 18 pages.
Notice of Allowance issued in U.S. Appl. No. 17/542,872, dated Jul. 11, 2022, 13 pages.
Notice of Allowance issued in U.S. Appl. No. 17/543,152, dated Jul. 29, 2022, 16 pages.
U.S. Appl. No. 17/543,152, filed Dec. 6, 2021, Bivolarsky et al.
U.S. Appl. No. 17/542,461, filed Dec. 5, 2021, Burcham et al.
U.S. Appl. No. 17/542,465, filed Dec. 5, 2021, Bivolarsky et al.
U.S. Appl. No. 17/542,872, filed Dec. 6, 2021, Bivolarsky et al.
U.S. Appl. No. 17/543,200, filed Dec. 6, 2021, Bivolarsky et al.
U.S. Appl. No. 17/746,622, filed May 17, 2022, Bivolarsky et al.
Office Action issued in U.S. Appl. No. 17/542,814, dated Aug. 26, 2022, 22 pages.
Office Action issued in U.S. Appl. No. 17/540,021, dated Sep. 15, 2022, 40 pages.
Office Action issued in U.S. Appl. No. 17/542,462, dated Nov. 14, 2022, 11 pgs.
Office Action issued in U.S. Appl. No. 17/566,020, dated Nov. 14, 2022, 21 pgs.
Notice of Allowance issued in U.S. Appl. No. 17/542,461, dated Oct. 12, 2022, 9 pages.
Notice of Allowance issued in U.S. Appl. No. 17/543,200, dated Nov. 3, 2022, 16 pages.
Notice of Allowance issued in U.S. Appl. No. 17/746,622, dated Nov. 8, 2022, 16 pages.
Notice of Allowance issued in U.S. Appl. No. 17/540,021, dated Mar. 6, 2023, 10 pgs.
Notice of Allowance issued in U.S. Appl. No. 17/541,036, dated Mar. 31, 2023, 9 pgs.
Office Action issued in U.S. Appl. No. 17/542,462, dated Mar. 17, 2023, 11 pgs.
Office Action issued in U.S. Appl. No. 17/566,020, dated Apr. 3, 2023, 20 pgs.
Office Action issued in U.S. Appl. No. 17/542,814, dated Apr. 6, 2023, 17 pgs.
Supplementary Partial EP Search Report issued in EP20 813 097.1, dated Jan. 13, 2023, 16 pgs.
U.S. Appl. No. 17/540,021, filed Dec. 1, 2021, Heim et al.
U.S. Appl. No. 17/541,036, filed Dec. 2, 2021, Heim et al.
U.S. Appl. No. 17/542,814, filed Dec. 6, 2021, Bivolarsky et al.
U.S. Appl. No. 18/111,376, filed Feb. 17, 2023, Bivolarsky et al.
U.S. Appl. No. 17/542,462, filed Dec. 5, 2021, Bivolarsky et al.
U.S. Appl. No. 17/566,020, filed Dec. 30, 2021, Bivolarsky et al.
U.S. Appl. No. 18/109,022, filed Feb. 13, 2023, Coleman et al.
Office Action issued in U.S. Appl. No. 18/111,376, dated Jun. 15, 2023, 28 pgs.
Supplementary Partial European Search Report issued in EP Application No. 20 832 739.5, dated May 25, 2023, 16 pgs.
International Search Report and Written Opinion issued in PCT/US23/12923 dated May 3, 2023, 9 pgs.
Office Action issued in U.S. Appl. No. 18/109,022, dated May 5, 2023, 18 pgs.

(56) References Cited

OTHER PUBLICATIONS

Supplementary European Search Report issued in EP Application No. 20 813 097.1, dated May 24, 2023, 20 pgs.
International Search Report and Written Opinion issued in PCT/US23/022505 dated Jul. 1, 2023, 9 pgs.
International Search Report and Written Opinion issued in PCT/US23/022511 dated Jun. 28, 2023, 14 pgs.
Office Action issued in U.S. Appl. No. 17/542,462, dated Sep. 6, 2023, 11 pgs.
European Search Report issued in EP Application No. 20832739.5, dated Sep. 6, 2023, 14 pgs.

* cited by examiner

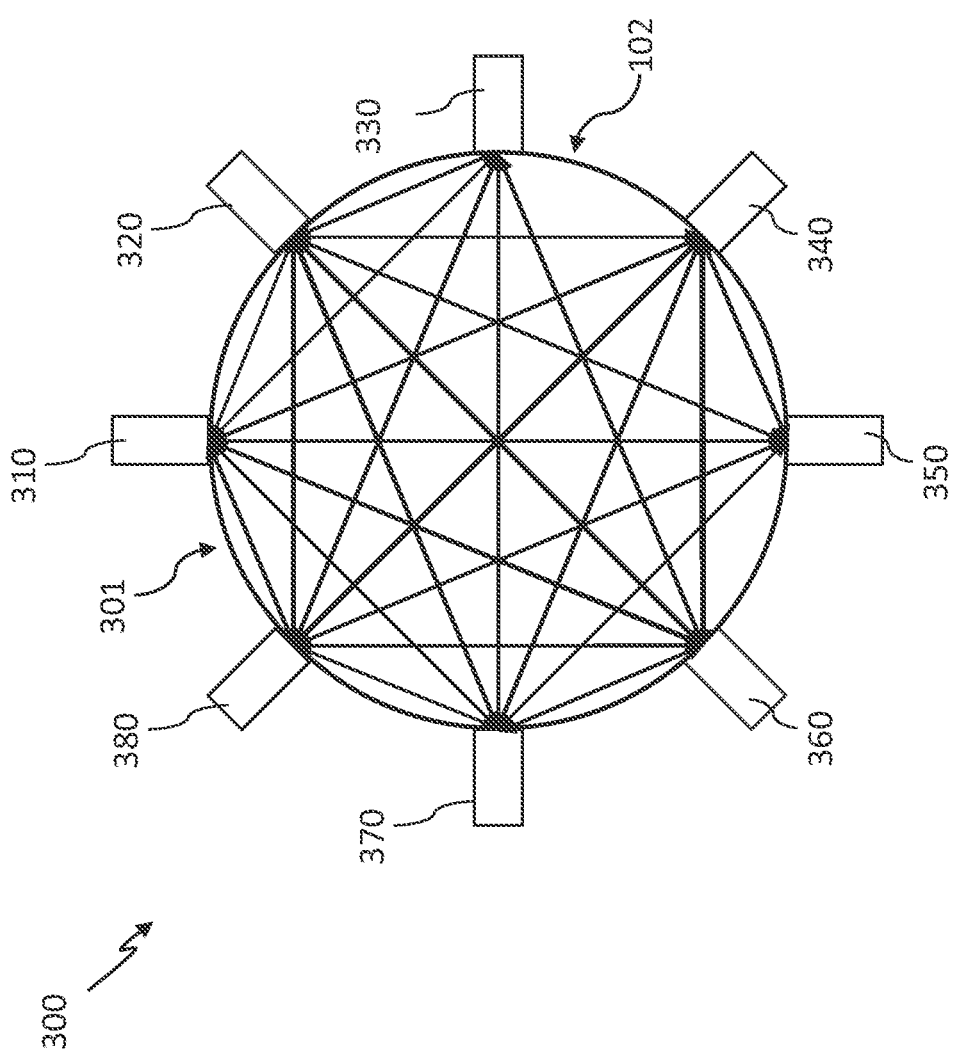

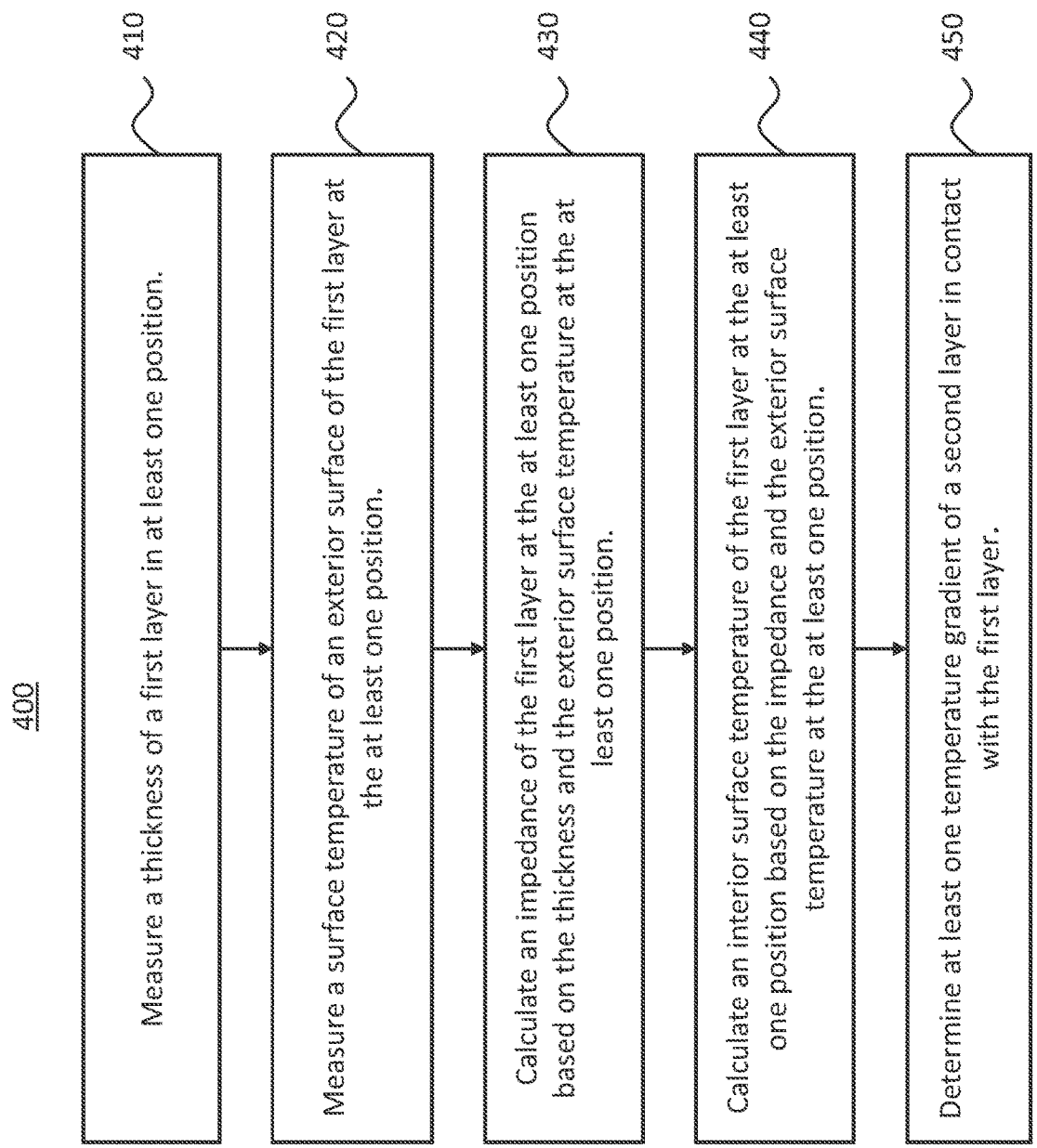

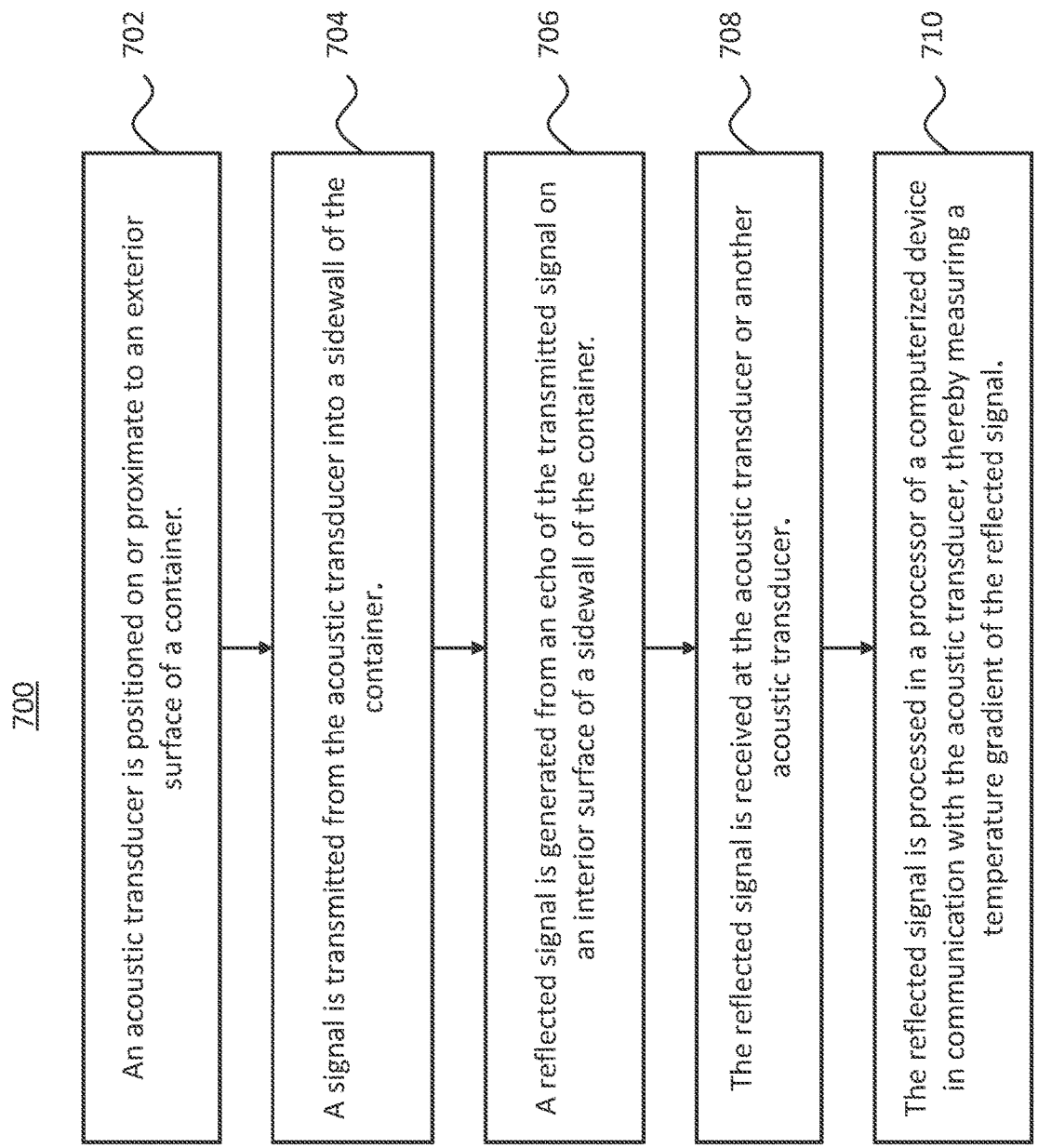

ACOUSTIC TEMPERATURE MEASUREMENT IN LAYERED ENVIRONMENTS

CROSS REFERENCE TO RELATED APPLICATION

This application is a continuation-in-part application of U.S. application Ser. No. 17/543,152 entitled, "Acoustic Temperature Measurement in Layered Environments" filed Dec. 6, 2021, which claims benefit of U.S. Provisional Application Ser. No. 63/121,755 filed Dec. 4, 2020, and titled "Acoustic Temperature Measurement in Layered Environments", the entire disclosures of which is incorporated herein by reference.

FIELD OF THE DISCLOSURE

The present disclosure is generally related to systems and methods for measuring temperature and more particularly is related to systems and methods for measuring temperature in layered environments.

BACKGROUND OF THE DISCLOSURE

Temperature measurement of a material is of paramount importance in determining other physical or any other properties of the material as well as in many processes. For materials enclosed within tubes, conduits, hoses, and other vessels, direct measurement of the temperature requires invasive measurement techniques, which cannot be performed without sensors located within the vessel. In many cases the temperature varies throughout the volume of the enclosure and creating accurate temperature measurement requires multiple invasive procedures which is not possible in uninterrupted processed and such measurement would interfere with process often rendering the measurement impossible.

Many investigators have looked at ways of measuring temperature non-invasively. Possible methods have included impedance tomography, microwave radiometry, and magnetic resonance imaging (MRI). MRI temperature imaging appears to have the required accuracy and spatial resolution for many thermal therapy scenarios, but it is expensive, requires a fixed installation and may be difficult to use. Nevertheless, at present MRI is the most advanced technology for non-invasive monitoring of thermal properties. However, MRI is not suitable for a number of industrial processes due to their configurations which include metal enclosures and pipelines that contain the material.

Thus, a heretofore unaddressed need exists in the industry to address the aforementioned deficiencies and inadequacies.

SUMMARY OF THE DISCLOSURE

Embodiments of the present disclosure provide a system for measuring a temperature gradient in a layered environment. Briefly described, in architecture, one embodiment of the system, among others, can be implemented as follows. A container has a sidewall. An acoustic transducer is positioned on or proximate to an exterior surface of the sidewall of the container. A signal is transmitted from the acoustic transducer into the sidewall of the container. A reflected signal is received by the acoustic transducer, or another acoustic transducer positioned on or proximate to the exterior surface of the sidewall. A computerized device has a processor and a computer-readable memory. The processor is configured to measure a temperature gradient of the reflected signal using an angle of incidence and refraction of the reflected signal. The temperature gradient indicates a temperature of a material within the container.

The present disclosure can also be viewed as providing an apparatus for measuring a temperature gradient in a layered environment. Briefly described, in architecture, one embodiment of the apparatus, among others, can be implemented as follows. An acoustic transducer is positioned on or proximate to an exterior surface of a container. The acoustic transducer is in communication with a computer processor, power source, and computer-readable memory. A signal is transmitted from the acoustic transducer into a sidewall of the container. A reflected signal is received by the acoustic transducer or another acoustic transducer. The processor is configured to measure a temperature gradient of the reflected signal using an angle of incidence and refraction of the reflected signal.

The present disclosure can also be viewed as providing methods of measuring a temperature gradient in a layered environment. In this regard, one embodiment of such a method, among others, can be broadly summarized by the following steps: positioning an acoustic transducer on or proximate to an exterior surface of a container; transmitting a signal from the acoustic transducer into a sidewall of the container; generating a reflected signal from an echo of the transmitted signal on an interior surface of a sidewall of the container; receiving the reflected signal at the acoustic transducer or another acoustic transducer; and processing the reflected signal in a processor of a computerized device in communication with the acoustic transducer, thereby measuring a temperature gradient of the reflected signal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A-3B are cross-sectional illustrations of a system for measuring temperature in a layered environment, in accordance with the first exemplary embodiment of the present disclosure.

FIG. 4 is a flowchart illustrating a method of measuring a temperature in a layered environment, in accordance with the first exemplary embodiment of the present disclosure.

FIG. 9 is a flowchart illustrating a method of measuring a temperature gradient in a layered environment, in accordance with the second exemplary embodiment of the disclosure.

DETAILED DESCRIPTION

Figure 1:
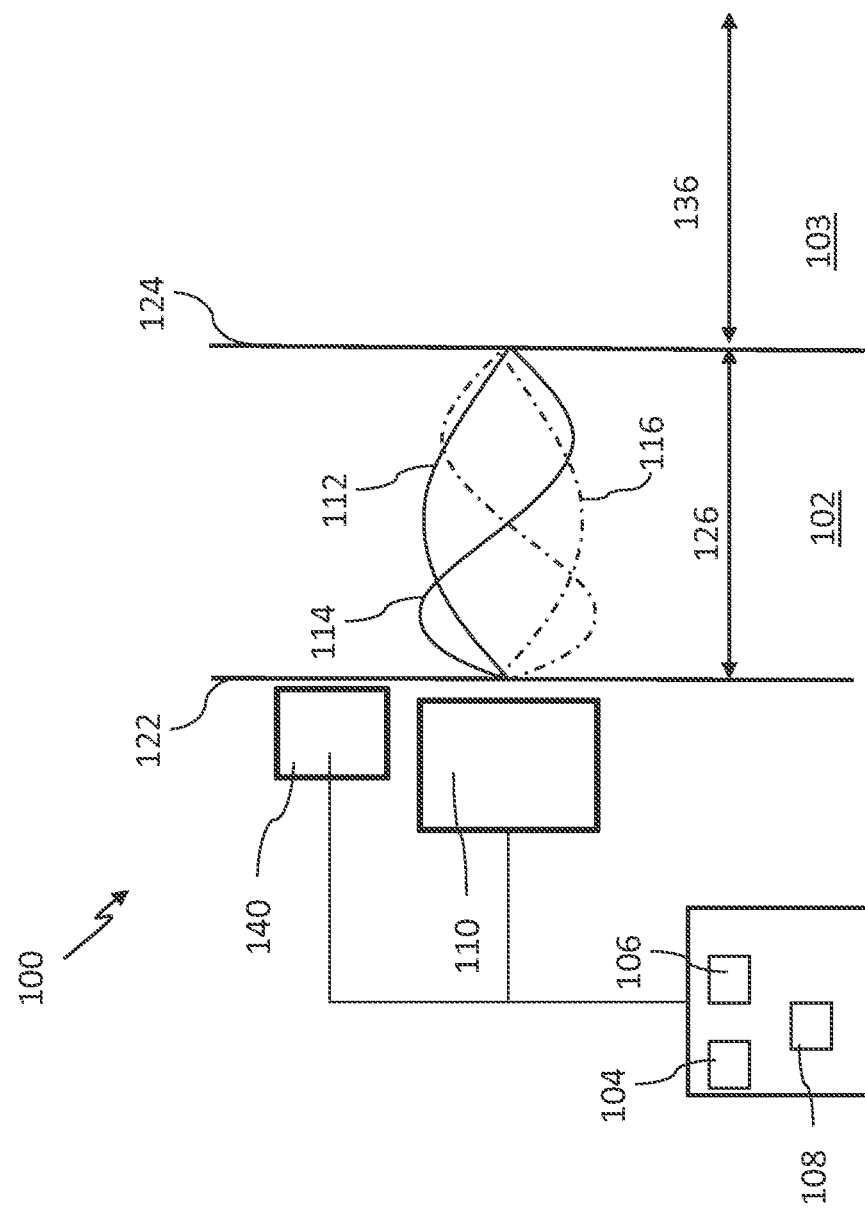
FIG. 1 is a cross-sectional diagrammatic illustration of an apparatus for measuring temperature in a layered environment, in accordance with a first exemplary embodiment of the present disclosure.

FIG. 1 is a cross-sectional diagrammatic illustration of an apparatus for measuring temperature in a layered environment ("apparatus") 100, in accordance with a first exemplary embodiment of the present disclosure. The apparatus 100 includes an ultrasound transducer 110 positioned perpendicular to an exterior surface 122 of a first layer 102. The ultrasound transducer 110 is in communication with a computer processor, power source, and computer-readable memory (not shown). The processor is configured to: measure a thickness 126 of the first layer 102; measure an exterior surface temperature of the first layer 102; calculate an impedance of the first layer 102 based on the thickness 126 and the exterior surface temperature; and calculate an interior surface temperature of the first layer 102 based on the impedance and the exterior surface temperature of the first layer 102.

The ultrasound transducer 110 may be any suitable transducer operating in the ultrasonic frequency range. In one example, the ultrasonic transducer 110 may emit and receive ultrasound signals 112, 114, 116. The ultrasound transducer 110 may be in communication with a computer processor 104, power source 106, and computer-readable memory 108, as is known in the art. The power source 106 may provide power to the ultrasound transducer 110 and the processor 104. The computer processor 104 may control the ultrasound transducer 110 to operate by emitting an ultrasound signal 112, 114 or receiving an ultrasound signal 116. The received ultrasound signal 116 may be received by the processor 104 and stored within the computer-readable memory 108.

The ultrasound transducer 110 may be positioned substantially perpendicular to an exterior surface 122 of a first layer 102. In one example, the first layer 102 may be a pipe or container wall, for instance, made from cast iron or any other suitable material. The wall may surround and contain an amount of solid, semi-solid, liquid, or gas, which may create a second layer 103. The ultrasound transducer 110 may emit an ultrasound signal 112, 114 into the first layer 102 through the exterior surface 122 and the interior surface 124. The ultrasound signal 112, 114 may be used to perform a number of measurements of the first and second layers 102, 103.

Matter in any state (solid, liquid and gas) expands when heated. The atoms themselves do not expand, but the volume in which they exist expands. When a solid is heated, its atoms vibrate faster about their fixed points. The relative increase in the size of solids when heated is small in comparison with liquids and gasses. However, gases and liquids that are contained in a fixed volume cannot expand— and so increases in temperature result in increases in pressure. Air temperature can be determined from the speed of an ultrasonic wave using the following equation:

$$C=331+0.6*T$$

where T (in kg/m$^3$) is the temperature of the air, C (in m/s) is the speed of the ultrasound wave, and 331 is the constant speed of sound in air at freezing temperatures. The speed of sound is affected by other factors such as humidity and air pressure. Temperature is also a condition that affects the speed of sound. Heat, like sound, is a form of kinetic energy. Molecules at higher temperatures have more energy, thus they can vibrate faster. Since the molecules vibrate faster, sound waves can travel more quickly. The speed of sound in room temperature air is 346 meters per second. This is faster than 331 meters per second. When a liquid freezes or melts, the temperature stays the same even though heat energy is still being released to the surroundings. Therefore, as an example, the process of precipitation or melting of paraffin wax does not affect the temperature of crude oil in a pipeline. In solids, a major part of acoustic energy is dissipated from the ultrasound wave due to heat.

Acoustic velocity can be determined by the following equation:

$$C=\sqrt{(E/d)}$$

where d (in kg/m$^3$) is the density of a material, C (in m/s) is speed of the ultrasound wave, and E (in Pa, N/m$^2$) is the Bulk Modulus of Elasticity.

In a layered environment, the temperature can be measured at the beginning of each layer in combination with properties of the material in each layer. In one example, the number of layers may be used in determining the temperature of each layer. The number of layers may be determined by any suitable method, including acoustic detection, laser measurements, knowing the material composition previously, and the others.

In one example, the processor may be configured to control the transducer 110 to create one or more ultrasound signals 112, 114. A first ultrasound signal 112 may be used to determine the thickness of any layers 102, 103. It should be understood that two layers 102, 103 are shown for illustration; however, the systems and methods described herein may be used to determine the temperature and other characteristics of any number of layers, and are not limited by way of example. The first ultrasound signal 112, 114 may include ultrasonic waves of varying wavelengths. In one example, the wavelength may be tuned across the ultrasonic spectrum until a half-wavelength 112 or multiple of a half-wavelength 114 signal corresponds to the thickness 126 of the first layer. This may cause a standing wave to be established within the first layer 102, producing resonance. The ultrasound signal 112, 114 may resonate for frequencies that have half wavelengths in multiples of its thickness 126. An emitted ultrasound signal 112 may reflect off of the interior surface 124 of the first layer 102 and the reflected ultrasound signal 116 may be received by the ultrasound transducer 110. Furthermore, higher-level harmonic resonance may be used to determine thickness 126 with greater accuracy. The thickness 126 of the first layer 102 may be determined from the wavelength of any signals creating resonance and the speed of the ultrasonic wave within the first layer 102. The first ultrasound signal 112, 114 may be repeated in order to determine the thickness 136 of any subsequent layers, for instance, if a pipe wall comprises multiple coatings or layers. Each layer may resonate at specific frequencies that are indicative of the layer thickness. Emitted signals 112, 114 may be reflected and received as reflected signals 116 by the ultrasound transducer 110 in each case. All layers that are of the same size may resonate at the same frequencies, and their responses may be separated using the signal delay.

It should be noted that FIG. 1 is a diagrammatic illustration intended to show the principle of operation of the apparatus 100. Accordingly, the ultrasound signals 112, 114 and return signal 116 are illustrated as transverse waves, rather than longitudinal waves for clarity. It should be understood that the illustrated transverse waves are offered as an example to show partial-wavelength and multiple-wavelength frequencies propagating through the first layer 102, and do not indicate a transverse modulation in amplitude. One of skill in the art will understand that the ultrasonic waves 112, 114 described herein oscillate in a longitudinal direction.

It should be noted that the thickness 126 of the first layer 102 may be known from the manufacturer's specification, for instance, in the case of pipes. However, it is possible that corrosion or other forces may have caused deterioration of the first layer 102 in one or more places, and assuming the thickness 126 from a specification may not be accurate. Therefore, it may be necessary to measure the thickness 126 of the first layer using the acoustic resonance method described herein in order to accurately determine the temperature and other characteristics of other materials within the first layer 102.

The processor may next be configured to measure an exterior surface temperature of the first layer 102. The exterior surface temperature may be determined from the formulas provided above, based on the speed of the returned wave detected by the ultrasound transducer 110. In another example, one or more exterior temperature sensors 140 may be used. Next, the processor may be configured to calculate an impedance of the first layer 102 based on the thickness 126 and the exterior surface temperature. This may be done by measuring the reflected energy from the exterior surface 122 of the first layer 102 and factoring the measured value with the material density of the first layer 102, which may be known from the manufacturer's specifications.

Next, the processor may be configured to calculate an interior surface temperature of the first layer 102 based on the impedance and the exterior surface temperature of the first layer 102.

This may be performed by measuring a time difference between a first echo or harmonic resonant reading detected by the ultrasound transducer 110 and a second echo detected by the ultrasound transducer 110. The time delay may allow the temperature of the interior surface 124 of the first layer 102 to be determined according to the following formula:

$$T_i = 2 * T_w - T_o$$

where $T_i$ is the temperature of the interior surface 124, $T_w$ is the temperature of the exterior surface 122, and $T_o$ is the ambient temperature.

Next, the processor may be configured to measure the amplitude of a return signal 116. By measuring the amplitude of the return signal 116, the attenuation of the signal may be determined. This may allow the processor to determine the location and impedance of the second layer 103, which may be understood from the following equation:

$$R = \left[ \frac{(Z_{2L} - Z_{1L})}{(Z_{2L} + Z_{1L})} \right]^2$$

Where R is the reflection coefficient, $Z_{2L}$ is the impedance of the second layer 103, and $Z_{1L}$ is the impedance of the first layer 102. R, the reflection of coefficient, is a fraction with a value less than 1. When R is multiplied by 100, it represents the percentage of the reflected energy from impedance barrier between two materials.

It should be noted that attenuation and speed of the signal are unrelated. Overall attenuation is increased when frequency increases or path length increases. The intensity of an ultrasonic beam that is sensed by a receiving transducer is considerably less than the intensity of the initial transmission. Scattering of ultrasonic waves is one of the major factors responsible for loss of beam intensity, and it is occurring because the material in which the ultrasonic wave is travelling is not homogeneous. The inhomogeneity may be anything that will present a boundary between two materials of different acoustic impedance such as an inclusion or pores and possibly grain boundaries containing contaminants. Certain materials are inherently inhomogeneous, such as cast iron and paraffin wax, which are composed of a matrix of grains and graphite particles (in the case of cast iron) which differ greatly in density and elasticity. Each grain in the agglomeration has radically different acoustic impedance and consequently produces severe scattering. It is possible to encounter scattering in a material of just one crystal type if the crystals exhibit velocities of different values when measured along axes in different directions. A material of this type is said to be anisotropic. If individual grains are randomly oriented throughout a material, scattering will occur as if the material is composed of different types of crystals or phases. Materials exhibiting these qualities not only decrease the returned ultrasound signal because of scattering, but also often produce numerous small echoes which may mask or "camouflage" real indications.

Absorption of ultrasonic waves is the result of the conversion of a portion of the sound energy into heat. In any material not at absolute zero temperature the particles are in random motion as a result of the heat content of the material. As the temperature increases, there will be an increase in particle activity. As an ultrasound wave propagates through the material it excites the particles. As these particles collide with unexcited particles, energy is transmitted causing them to oscillate faster and through larger distances. This motion persists after the sound wave has passed on, so energy of the passing wave has been converted to heat in the material.

Figure 2:
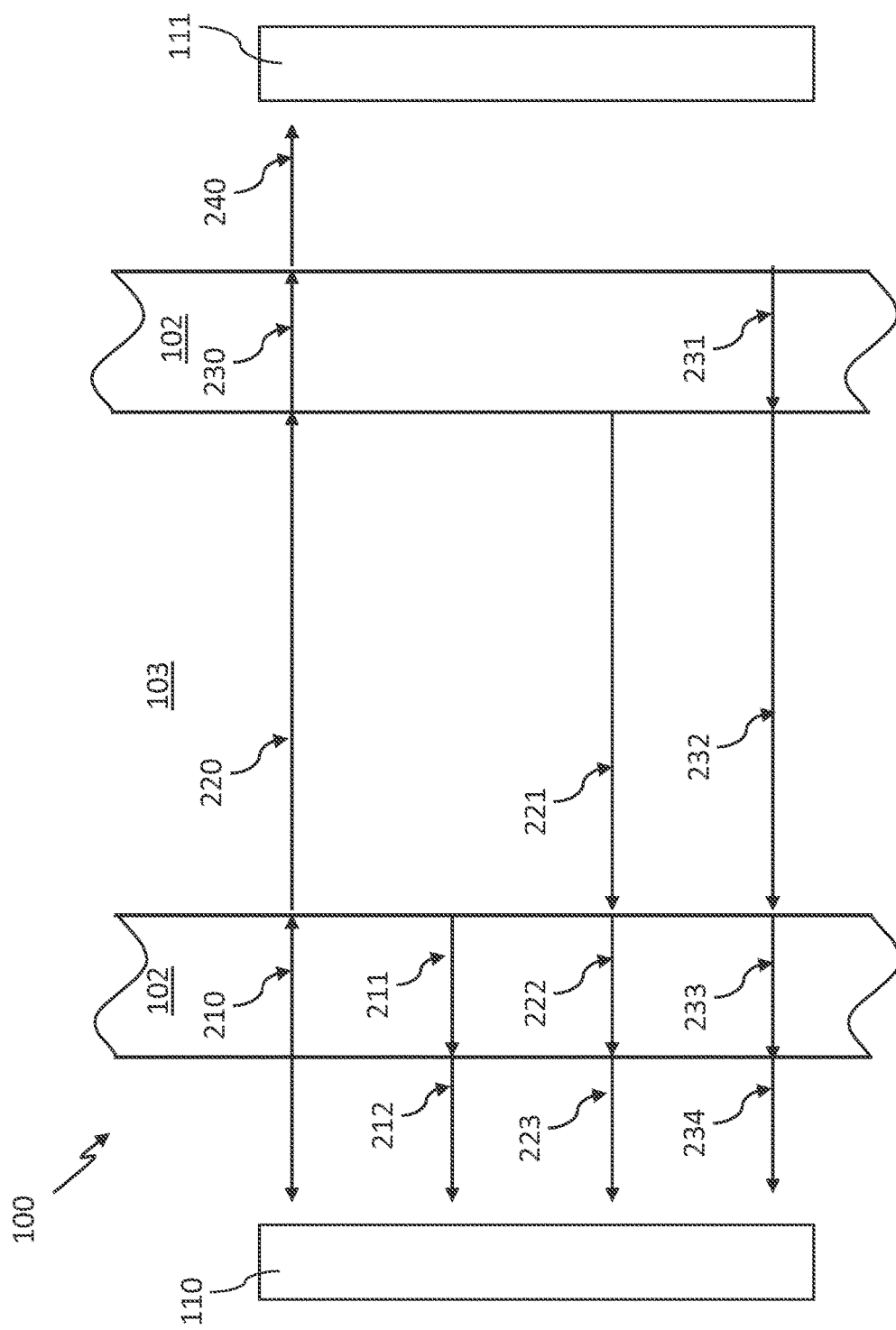
FIG. 2 is a diagrammatic illustration of the apparatus in operation, in accordance with the first exemplary embodiment of the present disclosure.

FIG. 2 is a diagrammatic illustration of the apparatus 100 in operation, in accordance with the first exemplary embodiment of the present disclosure. FIG. 2 illustrates the propagation of ultrasound signals through the first layer 102, second layer 103, and first layer (for instance, when the first layer 102 is a round pipe). One or more ultrasound transducers 110, 111 may be used to send and receive the signals as described relative to FIG. 1, above. FIG. 2 may further be understood relative to FIG. 1. Surfaces of the first and second layers 102, 103 have not been labeled to simplify the illustration.

In one example, a plurality of signals 210, 220, 230, 240 may result in a plurality of return signals or echoes 211, 212, 221-223, 231-234. Each echo 211, 212, 221-223, 231-234 may be useful in determining a property of the layers 102, 103 or the ambient environment. As can be seen from FIG. 2, signals 210, 220, 230, 240 may travel from a first ultrasound transducer 110 through the first layer 102, second layer 103, first layer 102, and into a second ultrasound transducer 111. At the boundary between each layer, the signals may reflect and/or propagate further. For example, a signal 210 traveling from the first ultrasound transducer 110 through the first layer 102 may reach the boundary between first and second layers 102, 103. The signal 210 may return toward the first ultrasound transducer 110 as echoes 211, 212. The signal 210 may continue as signal 220 through the second layer 103. When signal 220 reaches the boundary between the second layer and first layer 103, 102, the signal 220 may return toward the first ultrasound transducer 110 as echoes 221, 222, 223, each delineated by the boundaries between adjacent layers. The signal 220 may continue through the first layer 102 as signal 230. When signal 230 reaches the boundary between the first layer 102 and the second ultrasound transducer 111, it may return toward the first ultrasound transducer 110 as echoes 231, 232, 233, 234, each delineated by the boundaries between adjacent layers. Signal 230 may continue to the second ultrasound transducer 111 and be received and detected. Echoes 211, 212, 221-223, 231-234 may be received and detected by the first ultrasound transducer 110

TABLE 1

| | Layer Type | | | | | | |
|---|---|---|---|---|---|---|---|
| | Transducer | Cast Iron Surface | | | Fluid | | |
| | $Z_0$ | $Z_1$ | $Z_1$ | | $Z_2$ | | |
| Time | t0 | dt | t1 | dt2 | dt3 | $dt_4$ | $dt_5$ |
| Attenuation | 100% | 99% 86% | 98% 87% | 88% 10% | 9% | 8% | 7% |

| | Layer Type | | | | | | |
|---|---|---|---|---|---|---|---|
| | Fluid | | | | Cast Iron Surface | | Transducer |
| | $Z_2$ | | | | $Z_1$ | $Z_1$ | $Z_0$ |
| Time | $dt_5$ | $dt_4$ | $dt_3$ | $dt_2$ | $t_1$ | dt | $t_0$ |
| Attenuation | 7% | 6% | 5% | 5% | 0.50% | | 0.05% |

As can further be seen from FIG. 2 and Table 1, above, the attenuation of the signal degrades significantly as the signal passes through the first and second layers 102, 103, in this example, cast iron and fluid layers, respectively. Passing through the first layer 102 initially, the signal has a 99% and 98% attenuation. Passing through the second layer 103, the signal degrades from 10% to 5% attenuation in relatively linear steps. Passing through the final first layer 102, the signal degrades to about 0.5% attenuation.

Figure 3A:
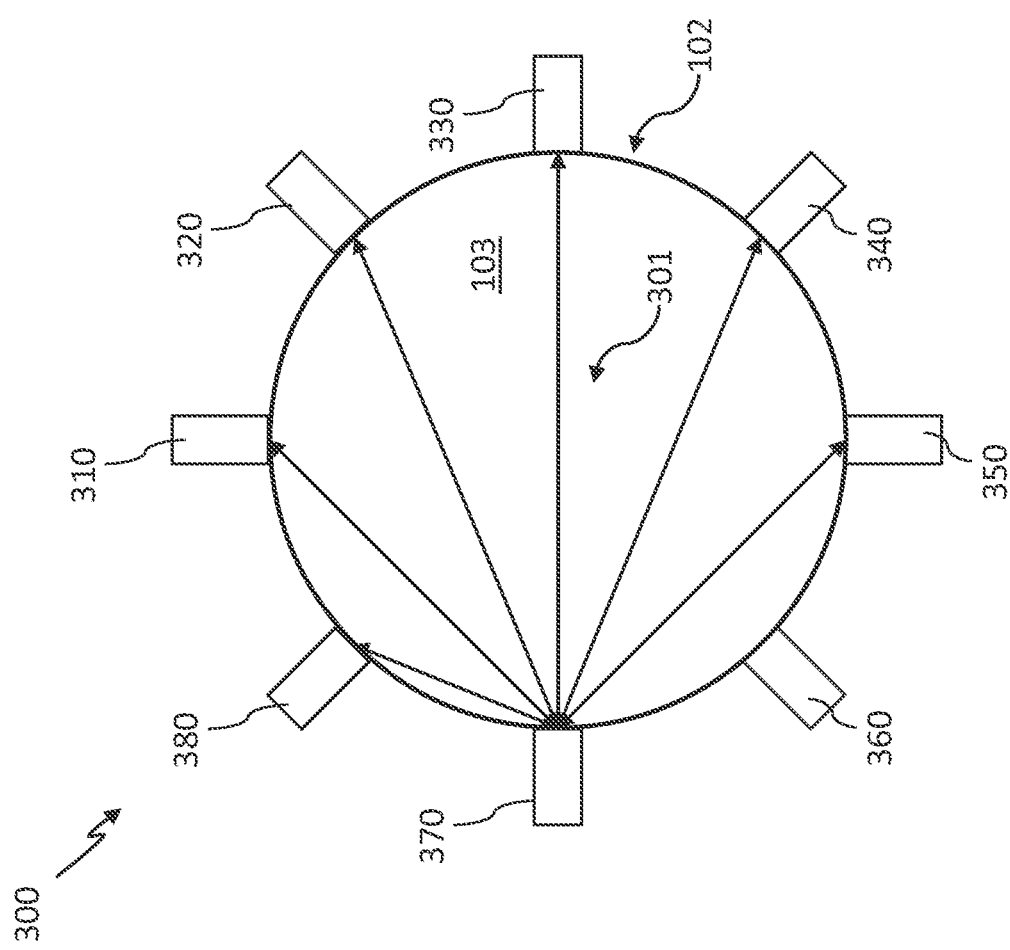

FIGS. 3A-3B are cross-sectional illustrations of a system for measuring temperature in a layered environment ("system") 300, in accordance with the first exemplary embodiment of the present disclosure. FIGS. 3A-3B show a plurality of ultrasound transducers 310-380 positioned perpendicular to a first layer 102, such as a pipe. The ultrasound transducers 310-380 may be in communication with at least one processor, power supply, and computer-readable memory as described above (not shown). The ultrasound transducers 310-380 are each located at a different position around the first layer 102. For example, the ultrasound transducers 310-380 may encircle the first layer 102 with a transducer located along each of a number of even divisions around the first layer 102, such that the ultrasound transducers 310-380 are separated about the exterior surface of the first layer 102 by even intervals. In another example, the ultrasound transducers 310-380 may be movable to different positions about the first layer 102. In one example, each transducer may be positioned directly opposite another transducer about the exterior surface of the first layer 102. For instance, ultrasound transducer 310 may be positioned opposite ultrasound transducer 350, and ultrasound transducers 320 and 360 may be positioned opposite one another, and so on. In another example, the ultrasound transducers 310-380 may be movable to be located opposite one another, or at any other suitable position relative to one another.

FIG. 3A shows that one ultrasound transducer 370 may emit ultrasound signals 301 to any number of the other ultrasound transducers 310-360, 380. The ultrasound signals 301 may be received by the other ultrasound transducers 310-360, 380 and processed to determine characteristics of the first layer 102 and the second layer 103, such as the layer thickness, exterior surface temperature, material impedance, interior surface temperature, and second layer temperature. This may be performed as described above. In one example, each ultrasound signal 301 emitted by an ultrasound transducer 310-380 may be reflected and received by the ultrasound transducer from which it originated to determine local material characteristics.

FIG. 3B illustrates that each ultrasound transducer 310-380 may emit ultrasound signals 301 to each other ultrasound transducer 310-380. The received ultrasound signals 301 may be processed to determine the desired characteristics of the first and second layers 102, 103. When a plurality of ultrasound transducers 310-380 are used, the system 300 may process the ultrasound signals 301 to determine a plurality of temperature gradients of the second layer 103. For instance, a temperature measured between transducers 310 and 350 may differ from the temperatures measured between transducers 320 and 360, 330 and 370, 340 and 380, and so on. This may be indicative of a local temperature nearer to a particular ultrasound transducer 310-380, as the temperature of the second layer 103 may not be even at all points within the second layer 103. Therefore, temperature values calculated between each ultrasound transducer 310-380 and each other ultrasound transducer 310-380 may correlate with local temperatures that gradually change throughout a cross-sectional area of the second layer 103. The processor may use these multiple temperature measurements to determine one or more temperature gradients within the second layer 103. In general, it is expected that the temperature at the center of the second layer 103 is higher than the temperature at the interior edge of the first layer 102.

With respect to FIGS. 1-3B, measurements may be performed at any suitable intervals. In one example, the ambient temperature may be monitored for changes, which may cause measurements to be performed again. In another example, data may be regularly sampled and the measurements performed again.

Additionally, ultrasonic tomographic imaging may be used to further map the temperature field within the first and second layers 102, 103. Tomographic imaging allows spatial variations of a physical variable in a material to be determined using only measurements made at the periphery of the area of interest. Ultrasonic waves may be propagated through the material in multiple directions, and a cross-sectional image may be reconstructed.

Resonant ultrasound spectroscopy may be employed using normal modes of elastic bodies to infer material properties such as elastic moduli and Q.

FIG. 4 is a flowchart 400 illustrating a method of measuring a temperature in a layered environment, in accordance with the first exemplary embodiment of the present disclosure.

It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Step 410 includes measuring a thickness of a first layer in at least one position. In one example, measuring the thickness of the first layer may include emitting, with an ultrasound transducer, an ultrasound signal between the exterior surface of the first layer and an interior surface of the first layer; and receiving, with the ultrasound transducer, the ultrasound signal reflected by the interior surface of the first layer. The ultrasound transducer may be selected, positioned, and operated as described above relative to FIG. 1. In one example, the ultrasound signal emitted by the ultrasound transducer may have a half-wavelength corresponding to the thickness of the first layer. This may cause a standing wave within the first layer, leading to resonance of the ultrasound signal within the first layer.

Step 420 includes measuring a surface temperature of an exterior surface of the first layer at the at least one position. In one example, measuring the surface temperature of the exterior surface may include determining, with the ultrasound transducer, a speed of the ultrasound signal; and correlating the speed of the ultrasound signal with a constant speed of sound in air at freezing temperatures. The speed of the ultrasound signal may be determined by analyzing the time required for the ultrasound transducer to receive a reflected signal after first emitting an ultrasound signal. This may be correlated with other material properties of the first layer and the determined thickness of the first layer in order to determine the distance traveled by the emitted and returned signals within the measured time.

Step 430 includes calculating an impedance of the first layer at the at least one position based on the thickness and the exterior surface temperature at the at least one position. In one example, calculating the impedance of the first layer may include measuring an energy of the reflected ultrasound signal; and factoring the measured energy with a material density value of the first layer.

Step 440 includes calculating an interior surface temperature of the first layer at the at least one position based on the impedance and the exterior surface temperature at the at least one position.

Step 450 includes determining at least one temperature gradient of a second layer in contact with the first layer.

The method may further include any other features, components, or functions disclosed relative to any other figure of this disclosure.

FIGS. 1-4 describe systems, apparatuses, and methods for measuring temperature in a layered environment in accordance with a first exemplary embodiment, but other variations on measuring temperature in a layered environment exist. To this end, FIGS. 5-9 describe a system, apparatus, and method for measuring temperature in a layered environment, in accordance with a second exemplary embodiment. In particular, the technologies described in the second exemplary embodiment are directed to temperature gradient measurements in a layered environment, such as an environment where distinct materials are in contact with one another.

Figure 5:
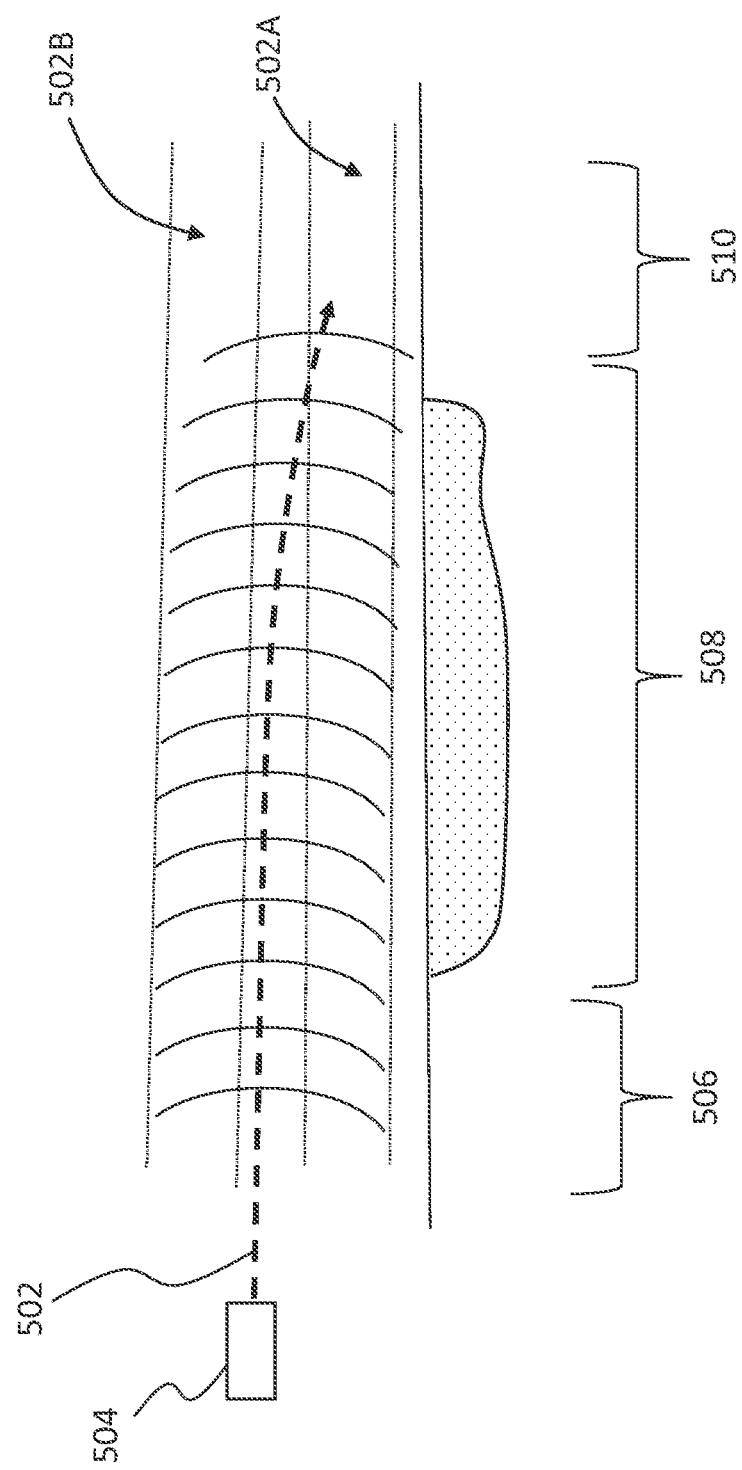
FIG. 5 is a diagrammatic illustration showing the relationship between an angle of incidence and refraction, in accordance with a second exemplary embodiment of the present disclosure.

FIG. 5 is a diagrammatic illustration showing the relationship between an angle of incidence and refraction, in accordance with a second exemplary embodiment of the present disclosure. When waves from light, acoustics, or other sources pass through a boundary between two different isotropic materials, the wave will move in a predictable path at the boundary between the materials. The movement of the wave can be predicted using Snell's Law, which describes the relationship between the angles of incidence and refraction of the wave. As shown in FIG. 5, an acoustic wave 502 is emitted from a source 504, such as an acoustic sensor or transducer, and the acoustic wave 502 travels a given length over an environment. The environment includes a first surface 506 which is formed from a first medium, a second surface 508 which is formed from a second medium, and a third surface 510 which is formed from the first medium, same as the first surface 506. In one example, the first and third surfaces 506, 510 may be land surfaces, e.g., a ground surface with soil, concrete, pavement, or a similar material, while the second surface 508 may be a liquid material, e.g., the surface of a body of water, a liquid chemical, or any other liquid or viscous substance.

Per Snell's Law, refraction of waves involves a change in the direction of waves as they pass from one medium to another. Refraction, or bending of the path of the waves, is accompanied by a change in speed and wavelength of the waves. If the media, or its properties, are changed, the speed of the wave is changed. Thus, waves passing from one medium to another will undergo refraction. As shown in FIG. 5, as the acoustic wave 502 passes from the first surface 506 having a first medium to the second surface 508, the wave encounters refraction which causes a change in its direction. In the example of FIG. 5 where the second surface 508 is water, because the water has a moderating effect upon the temperature of air, the air directly above the water tends to be cooler than the air far above the water. Acoustic waves travel slower in cooler air than they do in warmer air. For this reason, the portion of the wavefront 502A directly above the water is slowed down, while the portion of the wavefront 502B far above the water speeds ahead. As such, the direction of the wave 502 changes, refracting downwards towards the water.

Figure 6:
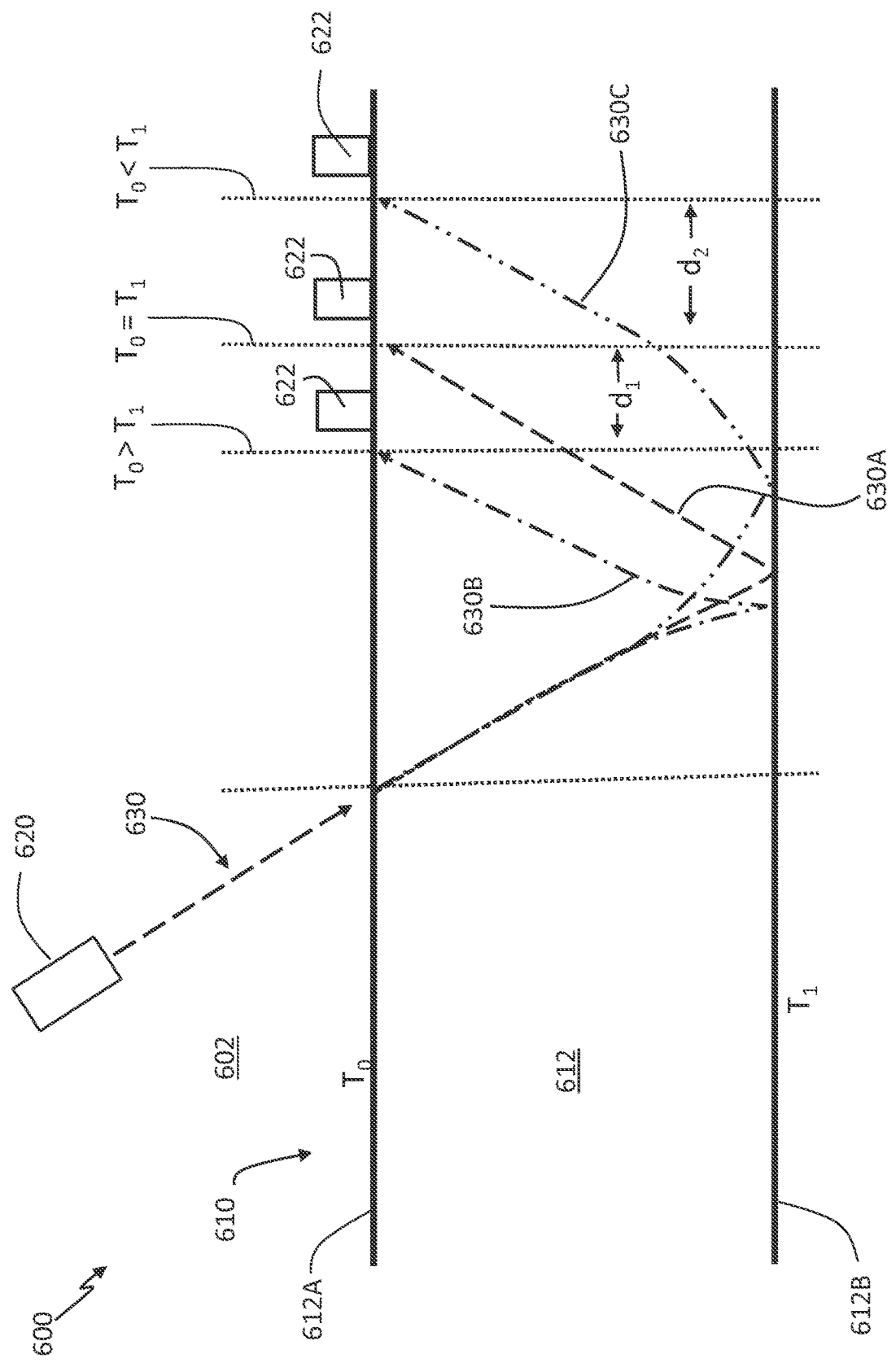
FIG. 6 is a diagrammatic illustration showing a system for measuring temperature gradients in a layered environment, in accordance with the second exemplary embodiment of the present disclosure.

The concept depicted in the diagram of FIG. 5 can be utilized in a system to conduct temperature sensing within a layered environment, namely by conducting temperature gradient measurements in a layered environment. FIG. 6 is a diagrammatic illustration showing a system 600 for measuring temperature gradients in a layered environment, in accordance with the second exemplary embodiment of the present disclosure. The system 600 may also be understood as an apparatus, or may be implemented as a method or process. As shown in FIG. 6, an acoustic sensor 620 or similar device, such as an acoustic transducer, is positioned relative to the sidewall 612 of a container 610. The sidewall 612 may be formed from various materials, such as metals or metallic compounds, such that a quantity of liquid 604 can be stored or held within the container 610, where the liquid 604 abuts an inner sidewall surface 612B. On the outside of the container sidewall 612 is the atmospheric air 602, which abuts an outer sidewall surface 612A. The acoustic sensor 620 may be mounted to the container sidewall 612 (not shown), or it may be positioned or held in a location near the sidewall 612. In FIG. 6, the acoustic sensor 620 is depicted spaced away from the sidewall 612 for clarity in disclosure of the signals emitted therefrom.

FIG. 6 depicts three different scenarios for signal transmission within the sidewall 612. In all three scenarios, the acoustic sensor 620 transmits an acoustic signal 630, e.g., an ultrasound signal or another acoustic signal, into the sidewall 612 of the container 610, where the acoustic signal 630 passes through the sidewall 612 until it reaches the inner sidewall surface 612B, at which point it is reflected back to the outer sidewall surface 612A. One or more acoustic sensors 622 may be positioned on or proximate to the sidewall 612 at the location of the reflected signal at the outer sidewall surface 612A of the sidewall 612. As indicated in FIG. 6, the temperature of the atmosphere 602 on the outside of the sidewall 612 is identified as $T_0$, while the temperature of the liquid 604 within the container 610 is identified as $T_1$.

In a first scenario, the temperature of the atmosphere 602 is equal to the temperature of the liquid 604 ($T_0=T_1$) when the signal 630 is emitted into the sidewall 612. When inside the sidewall 612, this signal 630A passes through the sidewall 612 and reflects back towards the outer sidewall surface 612A in substantially straight lines. This signal 630A is depicted in dash-dash broken lines in FIG. 6, and it can be detected along the outer sidewall surface 612A at a calculable or determinable location.

In the second scenario, the temperature of the atmosphere 602 is greater than the temperature of the liquid 604 ($T_0>T_1$), when the signal 630 is emitted into the sidewall 612. When inside the sidewall 612, this signal 630B passes through the sidewall 612 and reflects back towards the outer sidewall surface 612A in a curved line which has a curvature extending towards the outer sidewall surface 612A. This signal 630B is depicted in dash-dot-dash broken lines in FIG. 6, and it can be detected along the outer sidewall surface 612A at a calculable or determinable location which is closer to the point of signal entry than signal 630A. In particular, the exit of the signal 630B from the sidewall 612 can be detected at a distance $d_1$ less than the exit of signal 630A from the sidewall 612.

In the third scenario, the temperature of the atmosphere 602 is less than the temperature of the liquid 604 ($T_0<T_1$), when the signal 630 is emitted into the sidewall 612. When inside the sidewall 612, this signal 630C passes through the sidewall 612 and reflects back towards the outer sidewall surface 612A in a curved line which has a curvature extending towards the inner sidewall surface 612B. This signal 630C is depicted in dash-dot-dot-dash broken lines in FIG. 6, and it can be detected along the outer sidewall surface 612A at a calculable or determinable location which is further from the point of signal entry than signals 630A and 630B. In particular, the exit of the signal 630C from the sidewall 612 can be detected at a distance $d_2$ greater than the exit of signal 630A from the sidewall 612.

In each of these scenarios, the acoustic sensor 622 may be capable of detecting the location of signal exit from the sidewall 612 of the container 610, which, when combined with the known or determinable entry point of signal 630, can be used to determine whether the temperature of the liquid $T_1$ within the container 610 is greater than, less than, or equal to the temperature of the atmosphere $T_0$. The location of the signal exit from the sidewall 612 can be used to calculate the specific temperature difference between $T_0$ and $T_1$, such that when the atmospheric temperature $T_0$ is known, it is possible to identify the temperature of the liquid $T_1$, or vice-versa. Since the signal path follows the relationship between the angle of incidence and refraction put forth by Snell's Law, deviations in temperatures between the liquid 604 and the atmosphere 602, or deviations in temperature within the sidewall 612 of the container 610 itself, can be determined based on the signals. Other signal processing and analysis techniques may also be used, such as time-of-flight (TOF) analysis, reflection angles, or others.

The techniques described herein can be used to determine temperature or temperature gradients in various objects or environments, notably, within layered or multilayered environments where direct temperature sensing may not be feasible, e.g., due to inaccessibility or other factors. Detection of the temperature can also be conducted on each layer of a layered environment. It is also possible to detect temperature gradients that slowly increase or decrease throughout a layer or layers of an object, as well as more complicated situations where the temperature gradient increases to the center of liquid within a container or pipe, and then slowly decreases. These techniques can also be used to determine fluid flow characteristics, such as laminar and turbulent flow, based on temperature gradients. For example, vibrations in acoustic signals caused by temperature gradients may be used to measure fluctuations in the liquid density over time or turbulent sections of the flow, which might be used to estimate flow more accurately. Both the turbulence and the bending or curvature of the signal path may utilize accurate measurements of the peak of the signal geometrically located on the surface of the container 610.

Figure 7A:
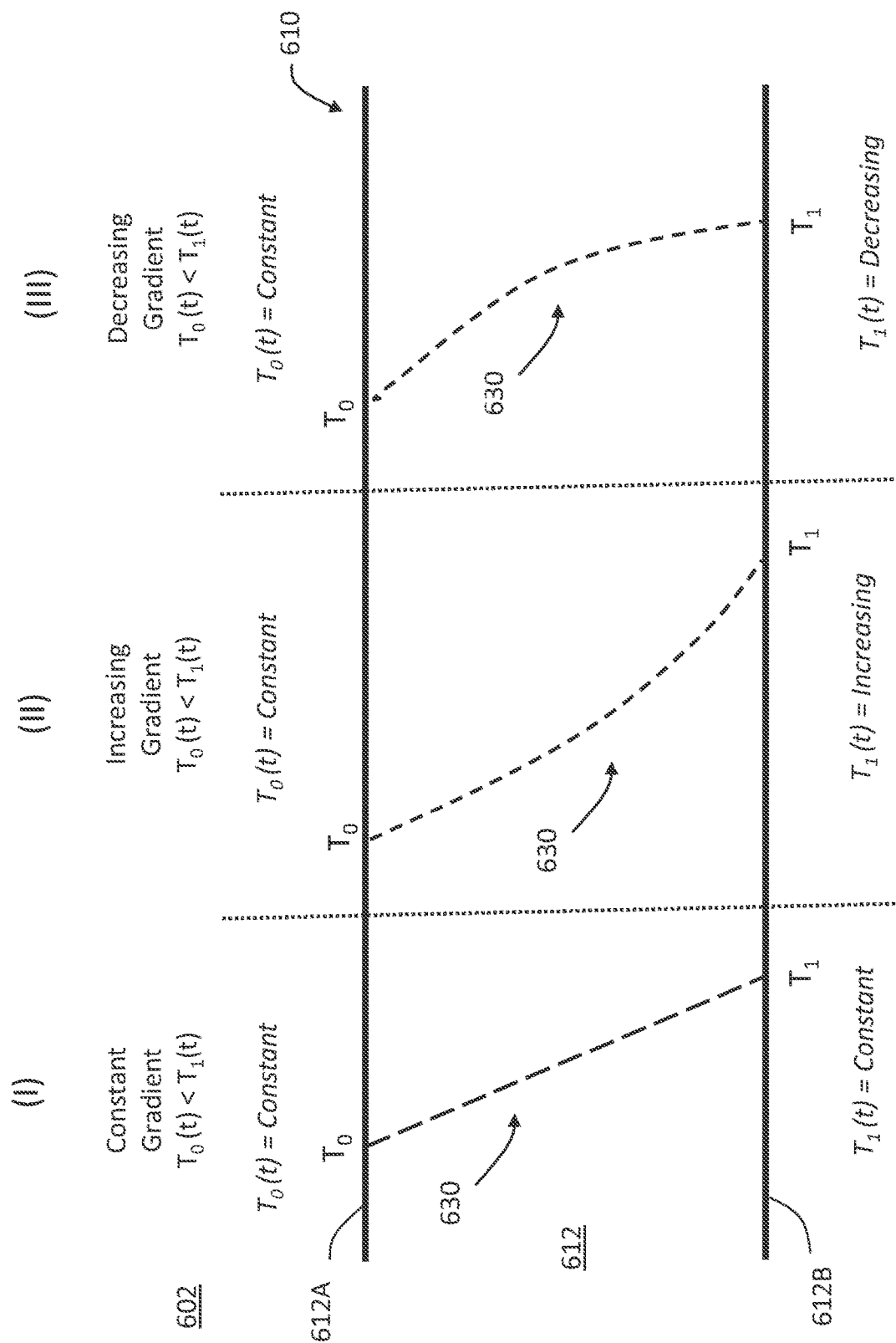
FIGS. 7A-7B are diagrammatic illustrations showing measurement scenarios of the system for measuring temperature gradients in a layered environment of FIG. 6, in accordance with the second exemplary embodiment of the present disclosure.
Figure 7B:
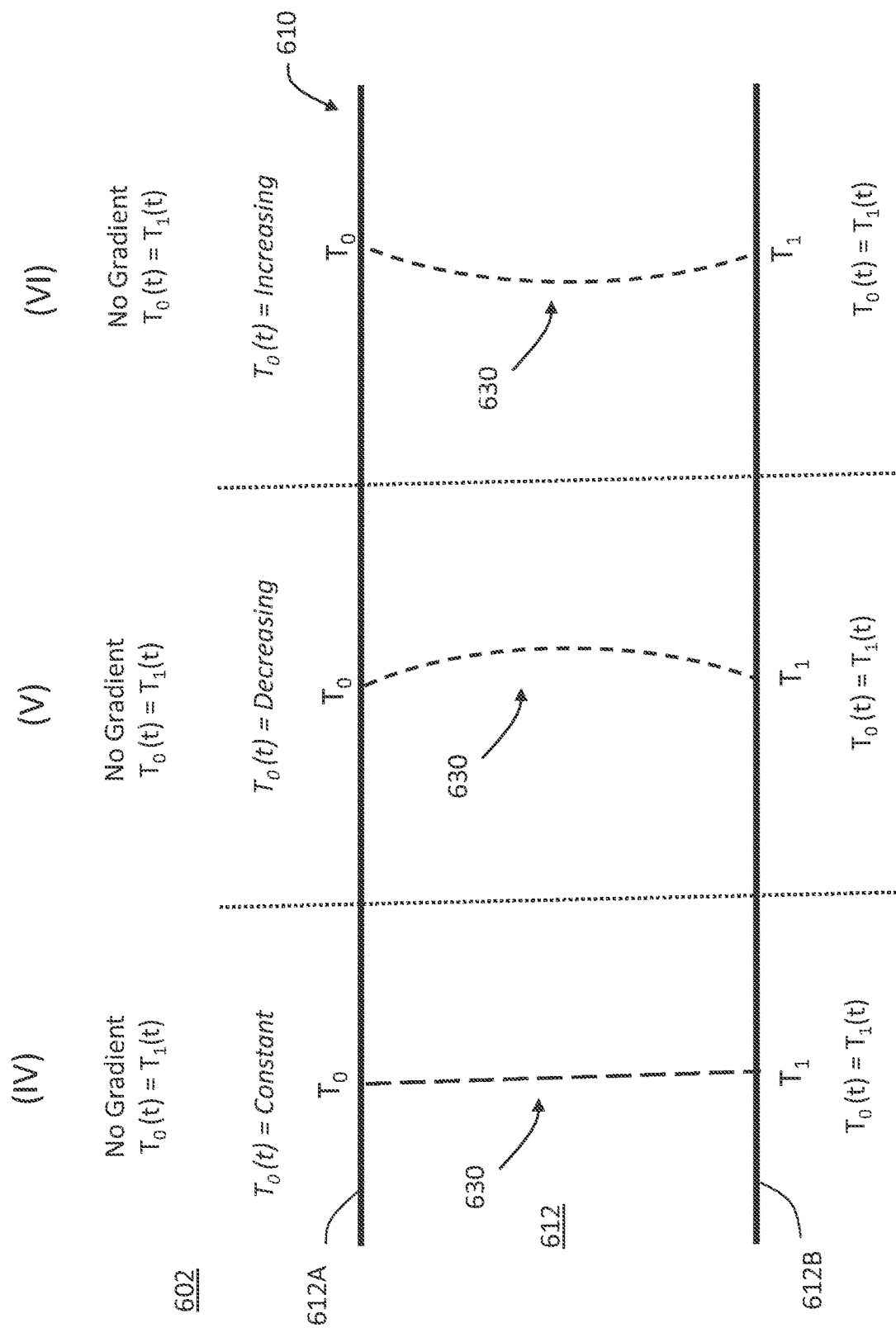

FIGS. 7A-7B are diagrammatic illustrations showing measurement scenarios of the system 600 for measuring temperature gradients in a layered environment of FIG. 6, in accordance with the second exemplary embodiment of the present disclosure. In particular, FIGS. 7A-7B depict different temperature gradient scenarios, with both dynamic and static temperatures, using one signal path that can determine first degree of shape changes of the signal. Each of the scenarios are depicted in use with a container 610 having a sidewall 612 which separates the exterior atmosphere 602 from a liquid 604 within the container 610, where the atmosphere 602 or air contacts the outer sidewall surface 612A and the fluid 604 contacts an inner sidewall surface 612B. The temperature of the atmosphere 602 is identified as $T_0$, whereas the temperature of the liquid 604 is identified as $T_1$. In all of the six scenarios described in FIGS. 7A-7B, for clarity in disclosure, the acoustic sensor is not depicted, nor is the initial acoustic signal transmitted into the sidewall 612. The acoustic signal 630 within the sidewall 612 is depicted in dash-dash broken lines.

In scenario (I) shown in FIG. 7A, $T_0$ and $T_1$ are constant, and $T_0$ is less than $T_1$. In this situation, the acoustic signal 630 emitted into the sidewall 612 will travel in substantially a straight line from the entry point on the outer sidewall surface 612A to the inner sidewall surface 612B. In this scenario, there is a constant temperature gradient in the sidewall 612, which may occur, for example, when a liquid 604 within the container has a constant temperature over time (t). The angled transmission direction of the signal 630 here occurs due to the temperature differential between the atmosphere 602 and the liquid 604.

In scenario (II), $T_0$ is constant while $T_1$ is increasing over time, and where $T_0$ is less than $T_1$. In this situation, the acoustic signal 630 emitted into the sidewall 612 will travel in substantially a straight line from the entry point on the outer sidewall surface 612A to approximately halfway through the sidewall 612, at which point the increasing temperature $T_1$ of the liquid 604 causes the signal 630 to curve in a direction in the sidewall 612 aligned with the signal transmission direction. The signal 630 travels in this curved shape until it reaches the inner sidewall surface 612B. In this scenario, there is an increasing temperature gradient in the sidewall 612, which may occur, for example, when a liquid 604 within the container has an increasing temperature over time (t).

Scenario (III) depicts a decreasing temperature gradient, which is the opposite of scenario (II). Here, $T_0$ is constant while $T_1$ is decreasing over time, and where $T_0$ is less than $T_1$. In this situation, the acoustic signal 630 emitted into the sidewall 612 will travel in substantially a straight line from the entry point on the outer sidewall surface 612A to approximately halfway through the sidewall 612, at which point the increasing temperature $T_1$ of the liquid 604 causes the signal 630 to curve in an opposite direction from scenario (II), e.g., in a direction in the sidewall 612 opposite to the signal transmission direction. The signal 630 travels in this curved shape until it reaches the inner sidewall surface 612B. In this scenario, there is a decreasing temperature gradient in the sidewall 612, which may occur, for example, when a liquid 604 within the container 610 has a decreasing temperature over time (t).

Scenario (IV) depicts a model with no temperature gradient. As shown, $T_0$ and $T_1$ are constant and remain equal to one another ($T_0=T_1$). In this situation, the acoustic signal 630 emitted into the sidewall 612 will travel in substantially a straight line from the entry point on the outer sidewall surface 612A to the inner sidewall surface 612B. In this scenario, there is a no temperature gradient in the sidewall 612, which may occur, for example, when a liquid 604 within the container 610 is the same temperature as the atmosphere 602 over time (t). Since the temperature is the same on both sides of the sidewall 612, there is no effect to the signal 630.

In scenario (V), there is no overall temperature gradient since the atmospheric temperature $T_0$ and the liquid temperature $T_1$ are equal, or when the same temperature air is on both sides of the sidewall 612, such as might occur in a pipeline. Here, $T_0$ and $T_1$ are decreasing, but decreasing at the same rate, such that $T_0=T_1$. In this situation, the acoustic signal 630 emitted into the sidewall 612 will travel in a curved line from the entry point on the outer sidewall surface 612A to approximately halfway through the sidewall 612, at which point the signal will curve in the opposite direction until it reaches the inner sidewall surface 612B. In this scenario, there is a decreasing temperature gradient in the sidewall 612 itself but constant and equal temperatures within the atmosphere 602 and liquid 604. This may occur, for example, in a pipe or similar container which is surrounded on both sides by the same atmosphere 602 or the same liquid 604, or two different substances with the same temperature.

Similar to scenario (V), in scenario (VI), there is no overall temperature gradient since the atmospheric temperature $T_0$ and the liquid temperature $T_1$ are equal, or when the same temperature air is on both sides of the sidewall 612, such as might occur in a pipeline. Here, $T_0$ and $T_1$ are increasing, but increasing at the same rate, such that $T_0=T_1$. In this situation, the acoustic signal 630 emitted into the sidewall 612 will travel in a curved line from the entry point on the outer sidewall surface 612A to approximately halfway through the sidewall 612, at which point the signal will curve in the opposite direction until it reaches the inner sidewall surface 612B. In this scenario, there is an increasing temperature gradient in the sidewall 612 itself but constant and equal temperatures within the atmosphere 602 and liquid 604. This may occur, for example, in a pipe or similar container which is surrounded on both sides by the same atmosphere 602 or the same liquid 604, or two different substances with the same temperature.

With regards to scenarios (V) and (VI), the temperature gradients inside the pipe, pipeline, or container may be useful in analyzing the flow of the liquid inside the container, pipeline, or pipe when turbulent flow occurs. Analyzing turbulent flow is one of the most difficult scenarios in a flow measurement and presents a problem for the existing flow measurement techniques. The aggregate result that is obtained though the techniques described herein fits in the flow measurement computation and eliminates the uncertainty component in processing material flow speed through the container or other enclosure. Additionally, it is noted that the situations where material or temperature boundaries are not strictly defined may also exhibit the same behavior as described relative to FIGS. 7A-7B. Multi-layered environments present the similar problems to that described herein, and they can be solved by these techniques with signal processing occurring one layer after another.

As can be understood, longitudinal waves may only pick up the average speed change which may not be enough to determine the gradient and therefor the temperature of the inside surface of the sidewall 612. The techniques used herein, however, allow for measurements of the impedance barrier correctly by measurement of the attenuation of the signal 630, as well as the time of flight of the signal, the signal path, and/or the reflection angles of the signal 630. This may also yield the ability to measure the type of the material on the inside of the sidewall 612 of the container 610.

While the scenarios of FIGS. 7A-7B depict different examples, there are other scenarios which are not depicted. For example, when the temperature is constant in the liquid or inside the pipe/container and changes are mostly happening on the outside of the container, the signal path may differ from what is described in FIGS. 7A-7B. This may be the case of environment-related temperature increases, such as from the thermal effects of sunshine. Additionally, the signal path may vary from what has been described in a situation where a moving liquid inside a pipe has higher temperature than the liquid that just passed through the pipe, such as may occur when different batches or types of fluid are moved through the same pipe. In this situation, the metal wall of the pipe transmits heat faster than the liquid or the air, such that the wall of the pipe will heat up first. These changes may need to be accounted for in order to be able to monitor the pipe or liquid therein accurately.

Figure 8A:
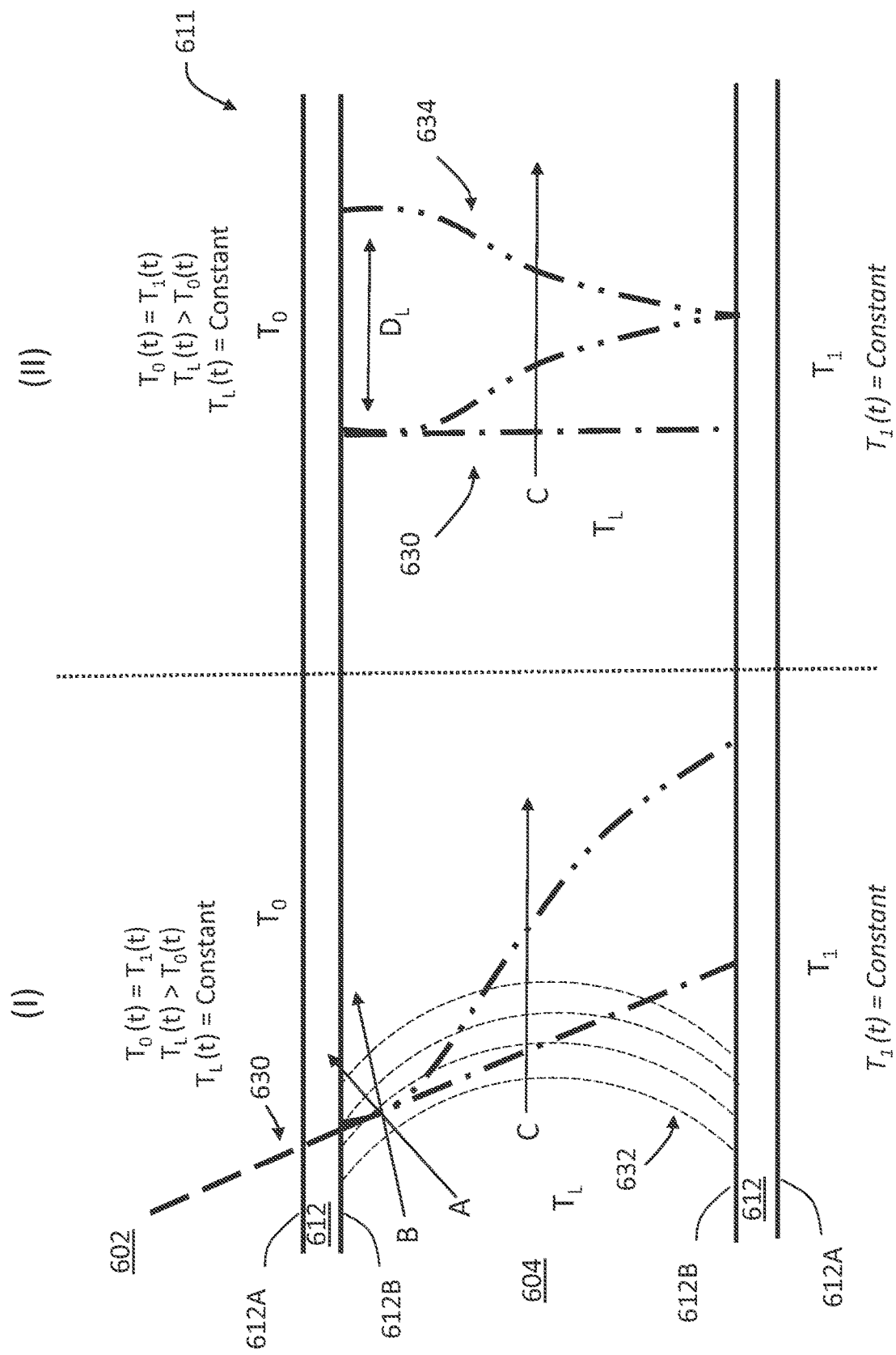
FIGS. 8A-8B are diagrammatic illustrations showing measurement scenarios through a pipe using the system for measuring temperature gradients in a layered environment of FIG. 6, in accordance with the second exemplary embodiment of the present disclosure.
Figure 8B:
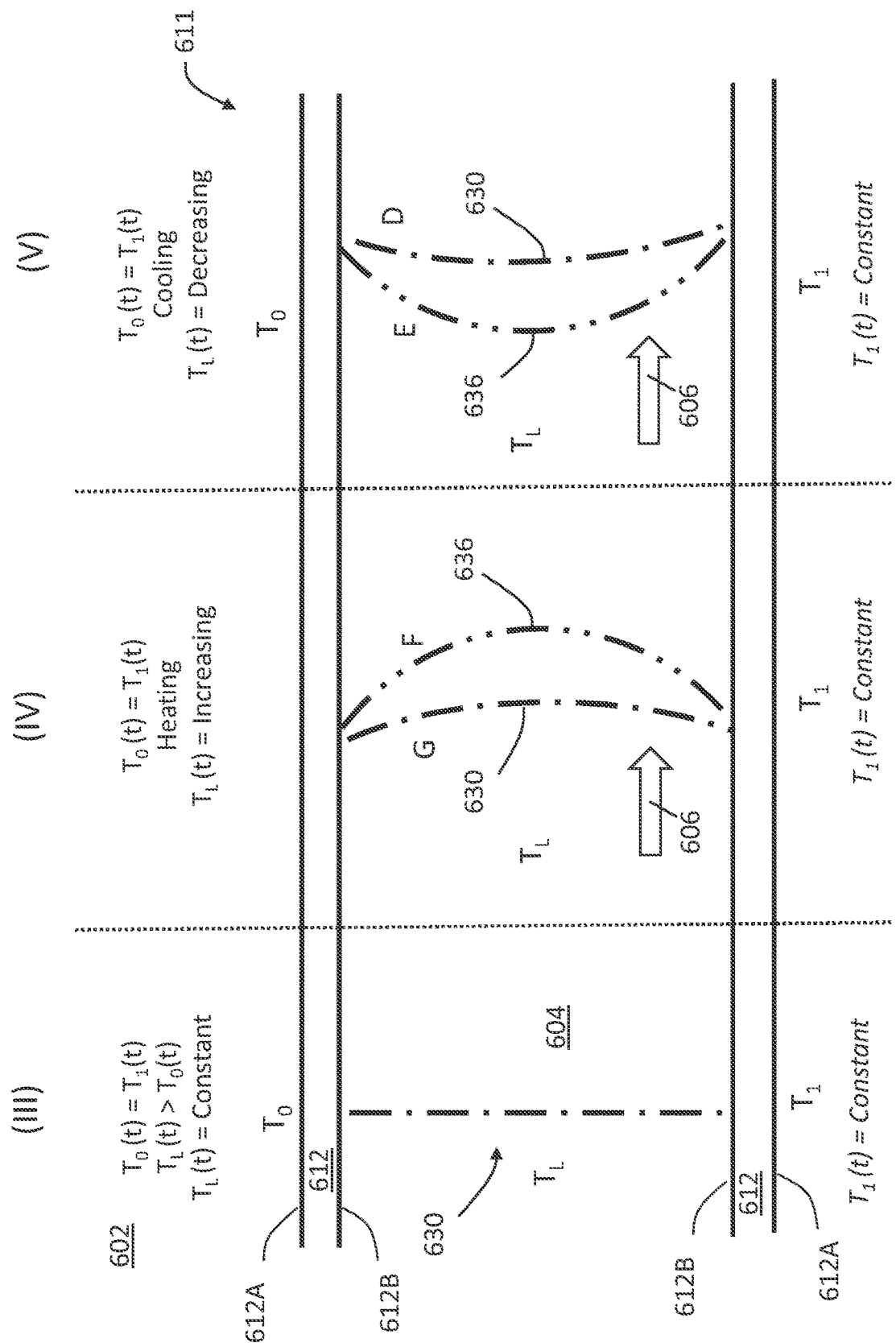

FIGS. 8A-8B are diagrammatic illustrations showing measurement scenarios through a pipe using the system 600 for measuring temperature gradients in a layered environment of FIG. 6, in accordance with the second exemplary embodiment of the present disclosure. In particular, FIGS. 8A-8B depict different temperature gradient scenarios, with both dynamic and static temperatures, when liquid is flowing within a pipe 611, pipeline, or other container that transports liquid, where the liquid may be static or flowing. Each of the scenarios are depicted in use with a pipe 611 having a sidewall 612 which separates the exterior atmosphere 602 from a liquid 604 within the pipe 611, where the atmosphere 602 or air contacts the outer sidewall surface 612A and the fluid 604 contacts an inner sidewall surface 612B. The temperature of the atmosphere 602 on a first side of the pipe 611 is identified as $T_0$, whereas the temperature of the other side of the pipe 611 is identified as $T_1$, and the temperature of the liquid 604 is identified as $T_L$. In all of the five scenarios described in FIGS. 8A-8B, for clarity in disclosure, the acoustic sensor is not depicted, nor is the initial acoustic signal transmitted into the sidewall 612. The acoustic signal 630 within the sidewall 612 is depicted in dash-dash broken lines.

Within all scenarios of FIGS. 8A-8B, it is assumed, for simplicity and clarity in disclosure, that the outside temperature $T_0$ of the atmosphere is constant and so are all other environmental conditions, to ensure that the temperature of the outer sidewall surface 612A of the pipe 611 is constant. In the case of varying outside temperature, some of the scenarios depicted in FIGS. 7A-7B may apply to the situations depicted in FIGS. 8A-8B.

In scenario (I), depicted in FIG. 8A, a shear wave 630 travels through the temperature gradient inside the pipe 611, where the top half of the pipe 611 has an increasing temperature gradient and the bottom half of the pipe 611 has a decreasing gradient, as indicated by vector C. Here, $T_0$, $T_1$ and $T_L$ are all constant, but $T_L$ is greater than $T_0$. Curves 632 describe layers of fluid 604 with same temperature, thus forming the temperature gradient. Vectors A and B, as labeled, are the normal vector to the gradient surface (A) and vector in the plane perpendicular (B) to the direction of the signal 630, which is also in the plane of the cross section depicted in scenario (I) in FIG. 8A. The scenario here may be seen when the liquid 604 within the pipe 611 is warmer in the middle of the pipe 611 than along the sidewalls 612.

In scenario (II), depicted in FIG. 8A, a longitudinal wave 630 travels through the temperature gradient inside the pipe 611, where the top half of the pipe 611 has an increasing temperature gradient and the bottom half of the pipe 611 has a decreasing gradient, as indicated by vector C. Here, $T_0$, $T_1$ and $T_L$ are all constant, but $T_L$ is greater than $T_0$. Here, the colder areas of the liquid along the bottom half of the pipe 611 will slow down the distribution of the acoustic wave 630 and the sections with warmer temperature will speed up the wave 630. In other words, the path of distribution of the acoustic wave 630 will turn towards the colder side after the signal 630 passes by the middle of the pipe 611, which will change toward the colder side, now on the opposite side, and then the mirrored signal 634 is reflected back to the sidewall 612. The exit point of reflected signal 634 may be separated a distance $D_L$ from the signal entry point. This deviation from the path of the signal 630 when traveling through temperature gradient can be measured in pulse-echo and pitch-catch cases by determining the distance from where the signal would have been directed, per Snell's Law, in the current temperatures without a gradient. The absolute value of the distance will be the measure of the gradient size. In this situation, longitudinal waves sent perpendicular through the sidewall 612 will experience similar path change to that described in scenario (I).

In scenario (III), depicted in FIG. 8B, a longitudinal wave 630 travels through a pipe 611 which has no temperature gradient. Here, $T_0$, $T_1$ and $T_L$ are all constant, but $T_L$ is greater than $T_0$. This scenario does not produce any deviation from the geometry of the signal path.

In scenarios (IV) and (V), depicted in FIG. 8B, a longitudinal wave 630 travels through an increasing temperature gradient inside the pipe 611. In scenario (IV), $T_0$, and $T_1$ are equal, while $T_L$ is increasing over time (t), which is the result of a flow of liquid through the pipe 611 which increases in temperature. In scenario (V), $T_0$, and $T_1$ are equal, while $T_L$ is decreasing over time (t), which is the result of a flow of liquid through the pipe 611 which decreases in temperature. In these two scenarios, the flow of the liquid 604 is indicated by arrow 606. In these scenarios, if the temperature of the liquid 604 flow changes, then the temperature gradient will change in the manner depicted in FIG. 8B. Specifically, in scenario (IV), an increasing temperature in the flow of the liquid 604 will cause the transmitted signal 630, depicted in dash-dot-dash broken lines to curve in the direction of flow 606, as indicated by signal 636, depicted in dash-dot-dot-dash broken lines. In scenario (V), a decreasing temperature in the flow of the liquid 604 will cause the transmitted signal 630, depicted in dash-dot-dash broken lines to curve in a direction opposite to flow 606, as indicated by signal 636, depicted in dash-dot-dot-dash broken lines. The sidewall 612 of the pipe 611 may experience similar changes of the gradient when the temperature of the liquid 604 flowing or sitting in the pipe 611 changes, since the sidewalls 612 are better at conducting heat in comparison with the atmosphere 602 and the liquid 604.

In scenarios (IV) and (V), it is possible to measure temperature on the border between two layers as well as the gradient of the temperature inside the sidewall 612 of the pipe 611. Additionally, it may be possible to go down multiple layers and identify all gradients and border temperatures within a given pipe 611 or container 612. This technique may also be able to measure all material properties including flow and density with lower errors and higher accuracy than conventional techniques.

It is also noted that the techniques described in scenarios (IV) and (V), as well as other scenarios, can be used to identify changes in fluid material flowing within a pipeline. For instance, within the oil and gas industry, pipelines are often used to transmit different materials at different times. Some materials have different temperatures than others based on when they're introduced to a pipeline. For example, if gas is flowing in a pipeline, it may have a first determinable temperature, while oil flowing behind the gas in the pipeline can have a different temperature. The systems disclosed herein can be used to identify the intersection or interface between the gas and oil, such that operators can make appropriate adjustments to direct the gas or oil to the desired location without experiencing undue waste of materials. Numerous other benefits of the systems disclosed herein are also envisioned, all of which are considered within the scope of the present disclosure.

FIG. 9 is a flowchart 700 illustrating a method of measuring a temperature gradient in a layered environment, in accordance with the second exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 702, an acoustic transducer is positioned on or proximate to an exterior surface of a container. A signal is transmitted from the acoustic transducer into a sidewall of the container (block 704). A reflected signal is generated from an echo of the transmitted signal on an interior surface of a sidewall of the container (block 706). The reflected signal is received at the acoustic transducer or another acoustic transducer (block 708). The reflected signal is processed in a processor of a computerized device in communication with the acoustic transducer, thereby measuring a temperature gradient of the reflected signal (block 710). Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An apparatus for measuring a temperature gradient in a layered environment, comprising:
    at least two acoustic transducers positioned on or proximate to an exterior surface of a container holding at least one of a liquid or a gas therein in a position abutting an exterior sidewall of the container, the at least two acoustic transducers in communication with a computer processor, power source, and computer-readable memory; and
    a signal transmitted from a first acoustic transducer positioned at a first location on the exterior surface of the container into a sidewall of the container, wherein a reflected signal is received by a second acoustic transducer positioned at a second location on the exterior surface of the container, wherein the processor is configured to measure a temperature gradient of the reflected signal using a deviation of a signal path of the reflected signal, an angle of incidence and refraction of the reflected signal, wherein the deviation of the signal path of the reflected signal is determined from a separated distance between a signal entry point on the sidewall of the container and a signal exit point from the sidewall of the container, and wherein at least one of a pulse-echo technique or pitch-catch technique is used to measure the separated distance.

2. The apparatus of claim 1, wherein the temperature gradient indicates a temperature of a material within the container.

3. The apparatus of claim 1, wherein the temperature gradient indicates a temperature of the sidewall of the container.

4. The apparatus of claim 1, wherein the container further comprises a pipe, wherein a liquid is flowing within the pipe.

5. The apparatus of claim 1, wherein the container further comprises a pipe, wherein a liquid flowing within the pipe has an increasing or decreasing temperature.

6. The apparatus of claim 1, wherein the container further comprises a pipe, wherein first and second liquids are flowing within the pipe at different times, wherein an interface between the first and second liquids is detectable based on the reflected signal.

7. A system for measuring a temperature gradient in a layered environment, comprising:
    a container having a sidewall and holding at least one of a liquid or a gas therein in a position abutting an exterior sidewall of the container;
    at least two acoustic transducers positioned on or proximate to an exterior surface of the exterior sidewall of the container;
    a signal transmitted from a first acoustic transducer positioned at a first location on the exterior surface of the container into the sidewall of the container, wherein a reflected signal is received by a second acoustic transducer positioned at a second location on the exterior surface of the container on or proximate to the exterior surface of the sidewall;
    a computerized device having a processor and a computer-readable memory in communication with the at least two acoustic transducers, wherein the processor is configured to measure a temperature gradient of the reflected signal using a deviation of a signal path of the reflected signal, an angle of incidence and refraction of the reflected signal, wherein the deviation of the signal path of the reflected signal is determined from a separated distance between a signal entry point on the sidewall of the container and a signal exit point from the sidewall of the container, and wherein at least one of a pulse-echo technique or pitch-catch technique is used to measure the separated distance, and wherein the temperature gradient indicates a temperature of the at least one of the liquid or gas within the container.

8. The system of claim 7, wherein the temperature gradient indicates a temperature of the sidewall of the container.

9. The system of claim 7, wherein the container further comprises a pipe, wherein a liquid is flowing within the pipe.

10. The system of claim 7, wherein the container further comprises a pipe, wherein a liquid flowing within the pipe has an increasing or decreasing temperature.

11. The system of claim 7, wherein the container further comprises a pipe, wherein first and second liquids are flowing within the pipe at different times, wherein an interface between the first and second liquids is detectable based on the reflected signal.

12. A method of measuring a temperature gradient in a layered environment, the method comprising:
    positioning at least two acoustic transducers on or proximate to an exterior surface of a container, the container holding at least one of a liquid or a gas therein in a position abutting an exterior sidewall of the container;
    transmitting a signal from a first acoustic transducer positioned at a first location on the exterior surface of the container into the exterior sidewall of the container;
    generating a reflected signal from an echo of the transmitted signal on an interior surface of the exterior sidewall of the container;
    receiving the reflected signal at a second acoustic transducer positioned at a second location on the exterior surface of the container; and
    processing the reflected signal in a processor of a computerized device in communication with the first and second acoustic transducers, thereby measuring a temperature gradient of the reflected signal, by determining a deviation of a signal path of the reflected signal determined from a separated distance between a signal entry point on the sidewall of the container and a signal exit point from the sidewall of the container, using at least one of a pulse-echo technique or pitch-catch technique to measure the separated distance, and using an angle of incidence and refraction of the reflected signal.

13. The method of claim 12, further comprising indicating a temperature of a material within the container based on the temperature gradient.

14. The method of claim 12, further comprising indicating a temperature of the sidewall of the container based on the temperature gradient.

15. The method of claim 12, wherein the container further comprises a pipe, wherein a liquid is flowing within the pipe.

16. The method of claim 12, wherein the container further comprises a pipe, wherein a liquid flowing within the pipe has an increasing or decreasing temperature.

17. The method of claim 12, wherein the container further comprises a pipe, wherein first and second liquids are flowing within the pipe at different times, wherein an interface between the first and second liquids is detectable based on the reflected signal.

* * * * *